United States Patent
Seiller et al.

(10) Patent No.: US 7,326,060 B2
(45) Date of Patent: Feb. 5, 2008

(54) VISUAL PERFORMANCE EVALUATION AND TRAINING SYSTEM

(76) Inventors: Barry Seiller, 881 N. Sheridan Rd., Lake Forest, IL (US) 60045; Kathy Puchalski, W308 Prospect Dr., Mundelein, IL (US) 60060

( * ) Notice: Subject to any disclaimer, the term of this patent is extended or adjusted under 35 U.S.C. 154(b) by 246 days.

(21) Appl. No.: 10/142,360

(22) Filed: May 9, 2002

(65) Prior Publication Data
US 2003/0211449 A1 Nov. 13, 2003

(51) Int. Cl.
*G09B 19/00* (2006.01)

(52) U.S. Cl. ........................... 434/258; 351/203
(58) Field of Classification Search ................. 434/258; 351/203; 600/558
See application file for complete search history.

(56) References Cited

U.S. PATENT DOCUMENTS

| | | | | |
|---|---|---|---|---|
| 5,051,931 | A * | 9/1991 | Cheu et al. | 600/558 |
| 5,206,671 | A * | 4/1993 | Eydelman et al. | 351/203 |
| 5,363,154 | A * | 11/1994 | Galanter et al. | 351/203 |
| 5,803,745 | A * | 9/1998 | Kozak et al. | 434/236 |
| 5,812,239 | A * | 9/1998 | Eger | 351/203 |
| 6,042,231 | A * | 3/2000 | Fateh | 351/203 |
| 6,364,486 | B1 * | 4/2002 | Ball et al. | 351/203 |
| 6,382,791 | B1 | 5/2002 | Strawderman et al. | |
| 6,497,576 | B1 * | 12/2002 | Smith | 434/236 |
| 6,533,417 | B1 * | 3/2003 | Sain | 351/203 |
| 6,540,355 | B1 * | 4/2003 | Couture | 351/203 |
| 2001/0028437 | A1 * | 10/2001 | Beresford et al. | 351/203 |

OTHER PUBLICATIONS

Printouts of Website of Performance Fundamentals Inc.; http://www.performancefundamentals.com; last modified Aug. 31, 2001.
"Eye Strain Relief," computer program by Maximum Performance, Inc.; attached are photocopies of all sides of the box containing the program.
Applicants are aware of vision therapy computer programs entitled "Home Therapy Systems," by RC Instruments; formerly of Cicero, Indiana, 1-800-346-4925, now believed to have moved to Phoenix, Arizona.
Phend, Crystal, "Training Eyes After Stroke-Induced Hemianopia Changes The Brain", Medpage Today, http://www.medpagetoday.com/Ophthalmology/GeneralOphthalmology, Aug. 14, 2007.
PR NEWSWIRE, "New State-Of-The-Art Vision Program to Optimize Vision of U.S. Athletes", http://sev.prnewswire.com/health-care-hospitals/20070801/NYW07201082007-1.html, Aug. 1, 2007.
"Study Published in Brain Injury Demonstrates Benefits of Cogmed Working Memory Training for Stroke Victims", Cogmed, http://www.cogmed.com/cogmed/articles/en/127.aspx.
Suchoff, Irwin and Gianutsos, Rosamond, "Rehabilitative Optometric Interventions for the Adult With Acquired Brain Injury", Therapeutic Interventions, pp. 608-621.
"Vision Training for DS in Q4", Gameplanet, http://www.gameplanet.co.nz/mag.dyn/News/11971.html, Jul. 13, 2007.

* cited by examiner

*Primary Examiner*—Xuan M. Thai
*Assistant Examiner*—Cameron Saadat
(74) *Attorney, Agent, or Firm*—Woodard, Emhardt, Moriarty, McNett & Henry LLP

(57) ABSTRACT

A program for self-evaluating and training a user's visual skills. The program including a plurality of evaluation and training exercises. The program being designed to run on a computer having a color monitor.

29 Claims, 27 Drawing Sheets

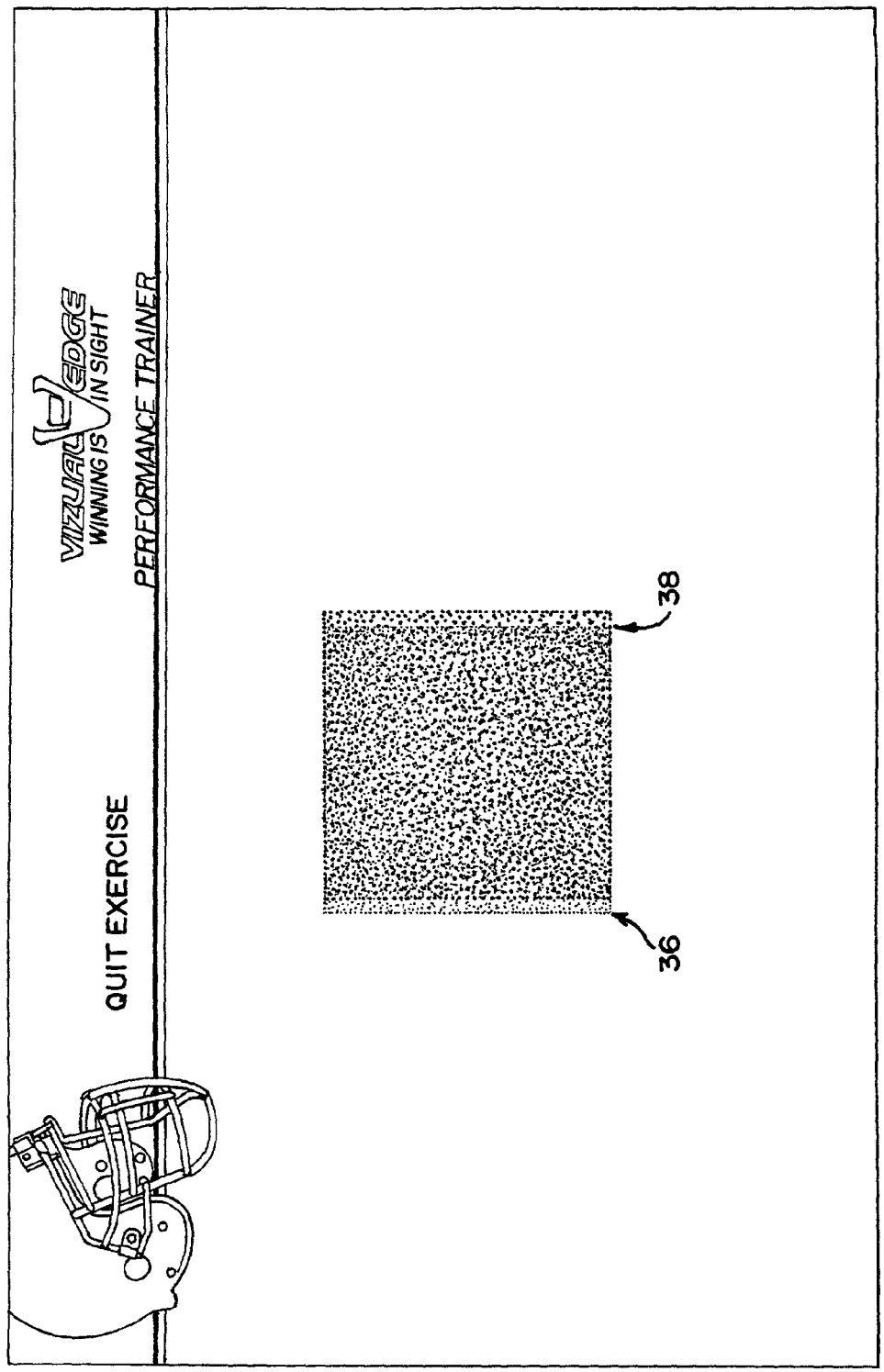

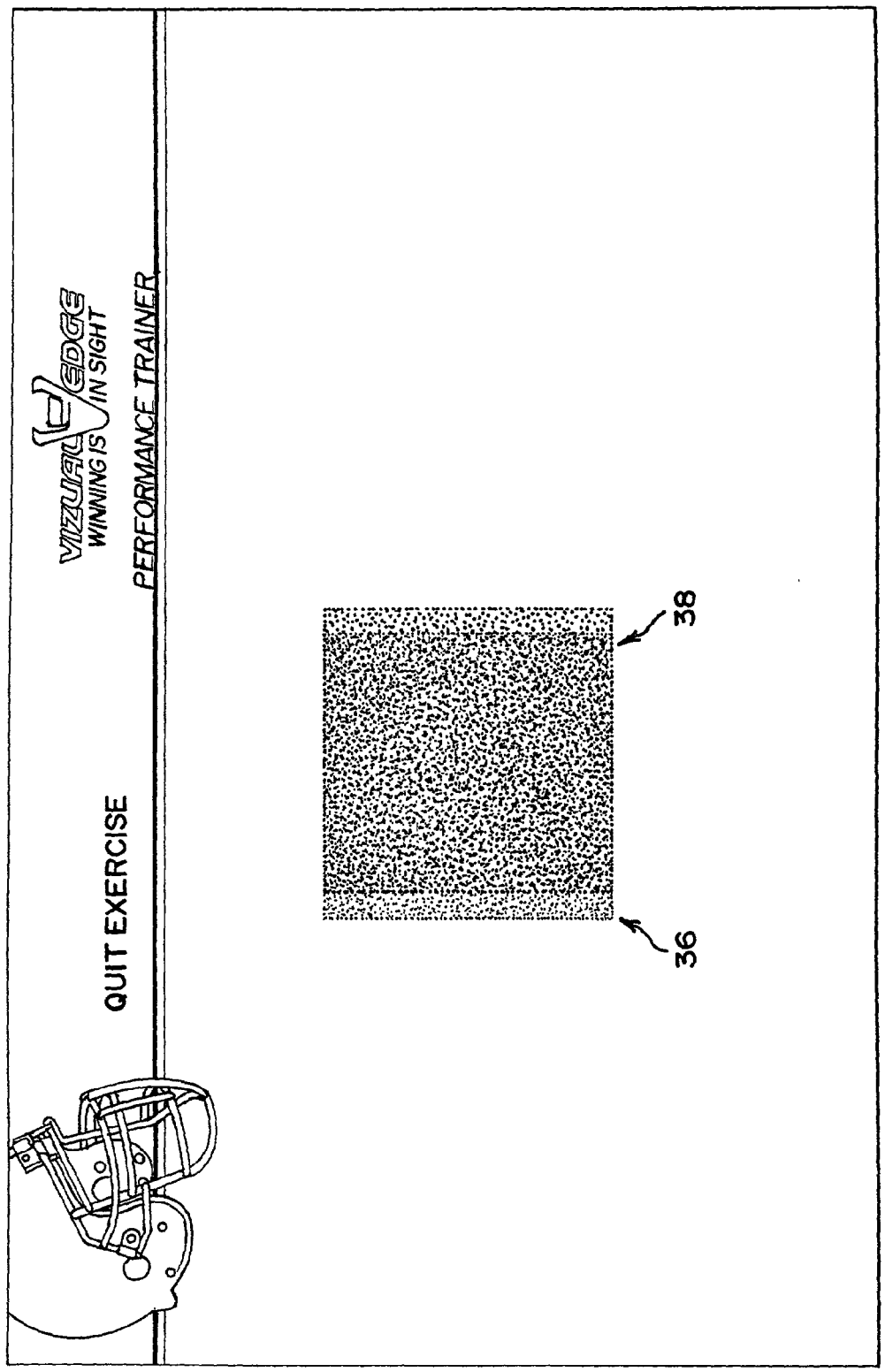

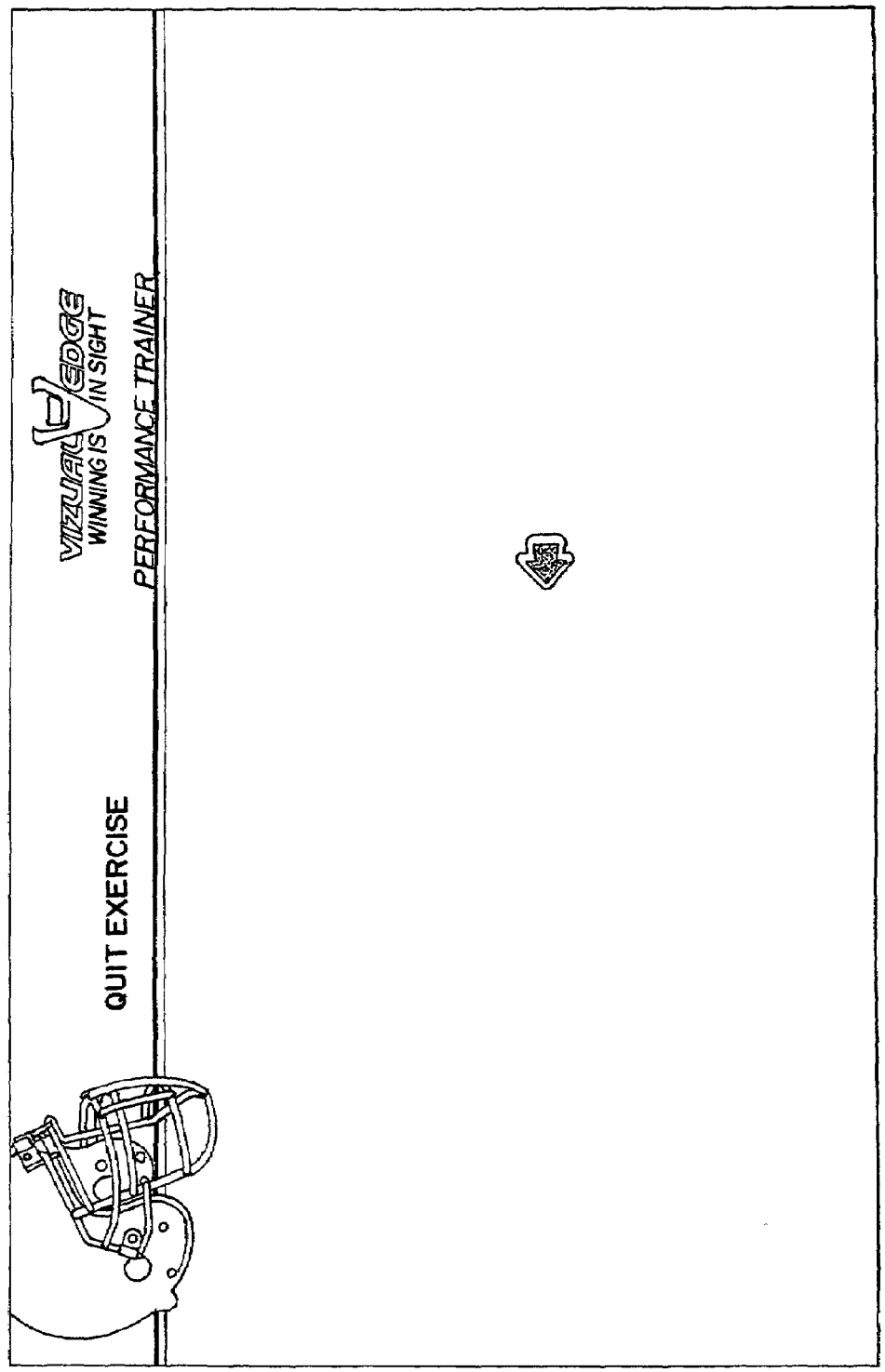

FIG.24

VIZUAL EDGE
WINNING IS IN SIGHT
PERFORMANCE TRAINER

LAST 5 SCORES FOR: RICK          SPORT: FOOTBALL

| | DATE | GAME TYPE | SIZE | DURATION | LEVEL | SCORE RATIO | STATION RATIO |
|---|---|---|---|---|---|---|---|
| VIZUAL FLEXIBILITY | 5/1/02 | CONVERGENCE | LARGE | 2 MIN | 2 | 8/14 | 3/77 |
| | 5/1/02 | CONVERGENCE | LARGE | 2MIN | 2 | 10/50 | 2/77 |

| | DATE | ALIGNMENT | STEPS | | | | VERTICAL ALIGNMENT |
|---|---|---|---|---|---|---|---|
| VIZUAL ALIGNMENT | 2/7/02 | CENTER | 0 | | | | |
| | 2/8/02 | BEFORE | 6 | | | | |
| | 5/1/02 | BEFORE | 1 | | | | HYPER |

| | DATE | # OF ARROWS | SIZE | FLASH TIME | DURATION | # OF LINES | AUDIO | AVG. RESPONSE TIME | SCORE RATIO |
|---|---|---|---|---|---|---|---|---|---|
| VIZUAL RECOGNITION | 5/1/02 | 3 | MED | .6 SEC | 2 MIN | 1 | YES | 12.5604 SEC | 3/24 |
| | 5/1/02 | 3 | MED | .6 SEC | 2 MIN | 1 | YES | 13.4667 SEC | 5/24 |
| | 5/1/02 | 3 | MED | .6 SEC | 2 MIN | 1 | YES | 42.0944 SEC | 1/9 |
| | 5/1/02 | 3 | MED | .6 SEC | 2 MIN | 1 | YES | 1.4529 SEC | 81/88 |

| | DATE | SIZE | FLASH TIME | DURATION | AUDIO | AVG RESPONSE TIME | SCORE RATIO |
|---|---|---|---|---|---|---|---|
| VIZUAL TRACKING | 2/8/02 | MED | .3 SEC | 2 MIN | YES | 0.5653 SEC | 132/136 |
| | 5/1/02 | MED | .3 SEC | 2 MIN | YES | 0.9360 SEC | 85/95 |

| | DATE | LEVEL 1 | LEVEL 2 | LEVEL 3 | LEVEL 4 |
|---|---|---|---|---|---|
| VIZUAL DEPTH SCREENER | 2/8/02 | CORRECT | CORRECT | WRONG | WRONG |
| | 5/1/02 | WRONG | WRONG | WRONG | WRONG |
| | 5/1/02 | CORRECT | CORRECT | CORRECT | CORRECT |
| | 5/1/02 | WRONG | WRONG | CORRECT | WRONG |
| | 5/1/02 | WRONG | WRONG | WRONG | WRONG |

PRINT RESULTS
◁ BACK TO MAIN MENU

VISUAL PERFORMANCE EVALUATION AND TRAINING SYSTEM

DESCRIPTION

1. Technical Field

The present invention relates generally to a system and method for evaluating and training visual skills; and more particularly, to a software program for use on a computer, that allows a user to evaluate and train the user's visual skills without the assistance of a physician or trainer, and to a method of self-evaluating and training one's visual skills at a user's desired pace.

2. Background of the Invention

It is common for athletes and others involved in physical competition or physically active occupations to exercise and train for such activities. However, such exercising and training typically only include cardiovascular and weight training. In other words, exercising and training the musculature required to perform the specific tasks of the activity. This is accomplished in a large number of ways, from use of personal trainers at pricey training centers to weight or aerobic equipment in the basement of one's home, to specially designed facilities for skills training, such as batting cages, driving ranges etc.

In addition to such common physical training, visual skills can also be improved. That is, visual skills, like all physical skills, can be taught, trained, practiced, perfected or enhanced. Such training can improve eye-hand coordination, dynamic visual acuity, visual recognition skills, depth perception and focusing.

Improved visual skills can provide a competitive advantage or enhance one's ability to perform a particular physical activity. This can be extremely important when world class athletes compete against one another. For example, in major league baseball, the athlete picking up a pitched ball more quickly after being released from the pitcher, tracking the ball's spin and direction, and maintaining focus until the ball reaches the plate, will be better situated to hit the ball or determine whether it is in the strike zone, than another athlete (having similar physical attributes) with poorer visual skills. That is, the athlete will have more time to react and provide the optimal physical response.

Some of the problems associated with physical exercising and training include boredom, expense, accessibility of proper exercising and training equipment, and ability to obtain proper instruction and feedback. Similar obstacles face visual training. Presently, it is necessary to visit an eye specialist to obtain a visual evaluation or training, or to obtain access to any advanced visual training equipment or procedures. While such equipment or procedures may include computer assisted training exercises, the eye specialist is needed to evaluate the user's visual fitness and to provide the necessary feedback associated with any improvement from use of such exercises. There has been little, if any, equipment and methods available to a user to train at his or her own pace at home, or wherever the user has access to a computer.

SUMMARY OF THE INVENTION

The present invention is a visual training system in the form of a software program that allows a user to evaluate the user's visual skills and/or to train and perfect such skills. The invention is not intended to be considered as a medical device.

The program provides the necessary feedback and guidance to walk the user through the appropriate steps to obtain the user's desired goals (in terms of visual enhancement). The program is preferably contained in a package including a CD and any necessary items to facilitate the training exercises or techniques. For example, red/blue glasses may be provided to enhance a three dimensional affect on the computer screen for certain training exercises. Because the program provides evaluation, instruction and feedback, the user can utilize the program to exercise and train at the user's own pace to achieve the user's desired results, without the need for an eye specialist or athletic trainer. The program allows the user to utilize the evaluation and training techniques at home or wherever the user has access to a computer with an appropriate monitor. Moreover, the program can be placed on a laptop computer. This allows the user to evaluate and train anywhere.

While the program is preferably packaged and distributed on a CD, the program can be on other computer readable media, such as floppy disks, or downloaded and stored in a computer memory. Moreover, the program may be obtained or used through a network, such as the world wide web, or loaded on a server for use on a local area network (LAN).

In one embodiment of the invention, a visual training system comprises a software program on a computer readable medium, such as a compact disc or floppy disc, for use with a computer and a monitor. The program has a first routine or exercise for evaluating at least one visual skill of a user and assigning an appraisal of the evaluated skill. The appraisal can be a value or other indicia level of the visual skill. The program further includes a second routine or exercise for training the visual skill of the user, and a third routine for guiding a user through use of the first routine and the second routine in order to evaluate and train the user's visual skills. Additionally, the system may include a plurality of routines for evaluating a corresponding plurality of visual skills of the user, and assigning an appraisal for each evaluated visual skill. These skills may include: visual alignment, depth perception, visual flexibility, visual recognition and tracking. Certain of the routines may require glasses to provide a three dimensional affect for the routine.

The system may further comprise a fourth routine for checking or displaying the user's progress after utilizing the second routine for training a visual skill.

In another embodiment, a visual evaluation and training system for improving a user's visual fitness comprises a program for operation on a computer, the program including a first routine for testing a plurality of visual skills of a user and for assigning an appraisal for each visual skill tested. Again, the appraisal may provide an indication of a value for each visual skill. The program also includes a second routine for exercising at least one of the user's tested visual skills.

In yet another embodiment, a method of evaluating and training a user's visual skills comprises the steps of providing a computer program having a routine for assessing visual skills, and a routine for training visual skills; assessing a first appraisal of a user's visual skills in response to the assessing (this may include providing an indication of a value for the user's visual skills); training the user's visual skills with the routine for training visual skills; reassessing the user's visual skills with the assessing routine; and, assigning a second appraisal for the user's visual skills in response to the reassessing. The method may further include providing a comparison between the first appraisal and the second appraisal.

Another embodiment of the invention provides for a method of assessing and training a user's visual skills comprising the steps of: providing a computer with a monitor for the user; providing a computer program for use with the computer, the computer program having a first routine for assessing at least one visual skill, a second routine for training the at least one visual skill and a third routine for tracking the progress of the training of the at least one visual skill; and, providing the user means for interacting with the computer in response to images generated by the computer program onto the monitor. Such means can be, for example, a keyboard, or a joystick or other controller.

The at least one visual skill can be selected from the group comprising depth perception, visual flexibility, visual alignment, visual recognition and visual tracking.

The first assessing routine may include a technique for assessing the user's at least one visual skill after the user interacts with the computer to perform certain tasks in response to the images generated by the computer program and for assigning the assessment a first value. The second training routine may include a technique for generating several exercises, each requiring the user to interact with the computer and perform certain tasks in response to the images generated by the computer program. Additionally, the third tracking routine may include a technique for comparing the first value with one or more subsequent values assigned to one or more subsequent assessments.

Further aspects of the invention are disclosed in the detailed description of the preferred embodiment, the drawings and the claims.

BRIEF DESCRIPTION OF THE DRAWINGS

While this invention is susceptible of embodiments in many different forms, there is shown in the drawings and will herein be described in detail a preferred embodiment of the invention with the understanding that the present disclosure is to be considered as an exemplification of the principles of the invention and is not intended to limit the broad aspect of the invention to the embodiment illustrated.

FIG. 13 is a screen shot of the visual flexibility exercise referenced in FIGS. 12A-C;

FIG. 14 is a further screen shot of the visual flexibility exercise referenced in FIGS. 12A-C;

FIG. 21B is a further screen shot of the visual tracking exercise referenced in FIG. 20;

FIG. 24 is a screen shot of an overall results screen.

DETAILED DESCRIPTION OF THE PREFERRED EMBODIMENT

Figure 1:
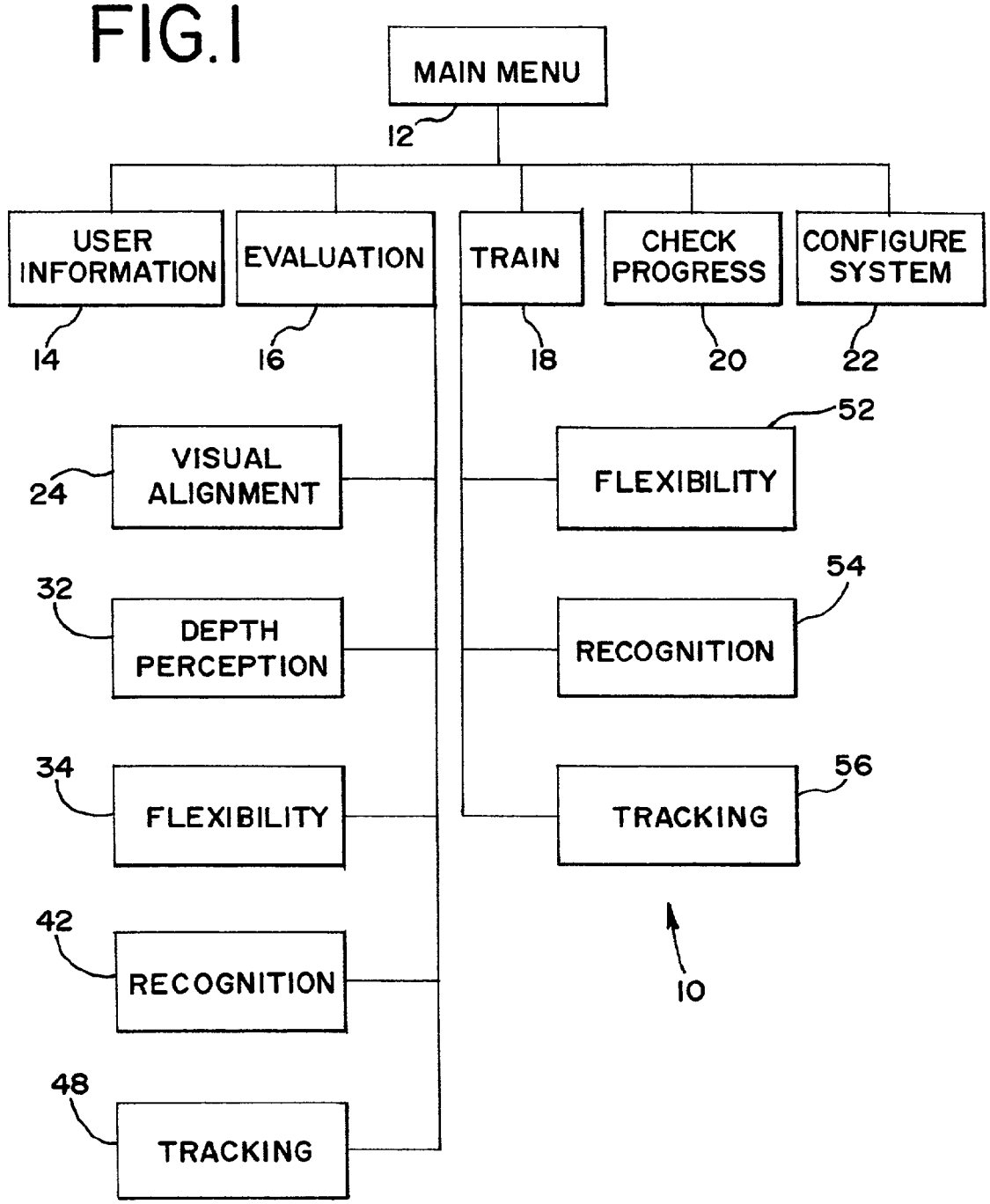
FIG. 1 is a flow chart of portions of a program for a visual training system of the present invention.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspects of the invention to the embodiments illustrated.

The present invention is a computer program for self evaluating and training a user's visual skills. The program is preferably provided on a compact disk (CD), a floppy disc, or is downloaded from an internet web site.

The program is designed to walk a user through a visual fitness evaluation and to provide exercises for both training and improving the user's visual skills. The user can perform the exercises at the user's desired rate. However, preferably, a user will utilize the system two to three times a week for a four to eight week period. Initially, the user should spend one to two minutes per exercise and gradually increase this amount as the user's eyes become more accustomed to each exercise. The user should also intermittently revisit the evaluation portion of the program to retest the user's visual skills and determined whether the user's visual skills have improved and by how much. The program preferably includes a database to store and maintain such historical evaluation or testing information. The program can then provide this information in a chart or graphical form to show the user's progress.

Referring to the flow chart of FIG. 1, the program 10 opens to a main menu 12 having a plurality of options for selection. The options direct the user to various portions or segments of the program. The main portions are set up to: provide explanation for utilizing the program 14; evaluate or assess the user's vision skills 16; train the user's vision skills 18; check the progress of the user's vision skills 20; and, configure the system 22. Other options can be employed as well. For example, the program can include a portion (accessible via the main menu 12) providing a sport specific background (i.e., wallpaper) that the user may select.

The configured system portion of the program 22 directs the user to appropriately configure the color, resolution, brightness and contrast of the computer's monitor to effectively implement certain of the evaluation and training exercises. Additionally, this portion 22 also directs the user to adjust the audio system on the computer, again, for use with certain of the exercises.

The evaluation and training portions 16, 18 of the program contain a plurality of routines or exercises for evaluating and training one's visual skills. For purposes of this application, a "routine" is a series of program commands or steps in the program for carrying out a particular function, regardless of whether those commands or steps are logically grouped together within the software code of the program. The routines or specific exercises employed to evaluate and train a user's eyes incorporated in the present program, can be known computer programs or subprograms that heretofore have only been employed by professional eye specialists. However, unlike the program of the present invention, such known computer programs required an eye specialist to assist in the training and evaluation. The present program provides an overlaying routine that coordinates use of the evaluation and training exercises and allows a user to utilize these known exercises to self evaluate and/or train his or her vision, at that individual's pace and convenience. In this regard, the program analyses the results of the exercise and provides feedback in the form of an appraisal of the user's visual skill being evaluated or trained.

The known programs are interactive programs that require the user to react to, or provide input in response to, objects appearing on the computer monitor as described in detail below. Certain of these programs have various parameters (e.g., timing, complexity etc.) that the user may modify as desired or recommended to achieve the desired visual skills. The input can be provided by the user utilizing the computer keyboard (e.g., the arrow keys), or by a joystick or other similar game controller.

Figure 2:
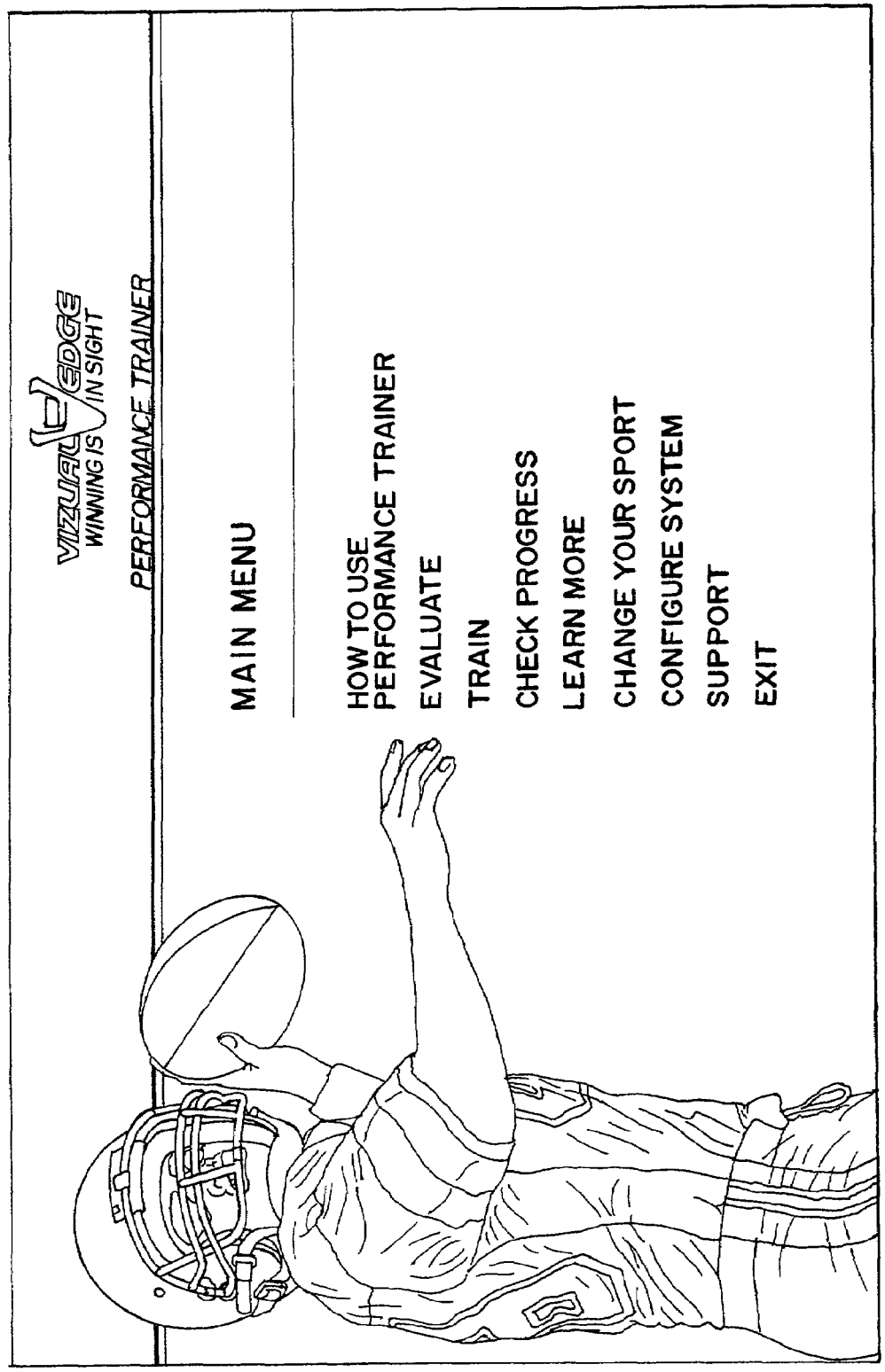
FIG. 2 is a screen shot of a main menu of the visual training system of the present invention.
Figure 3:
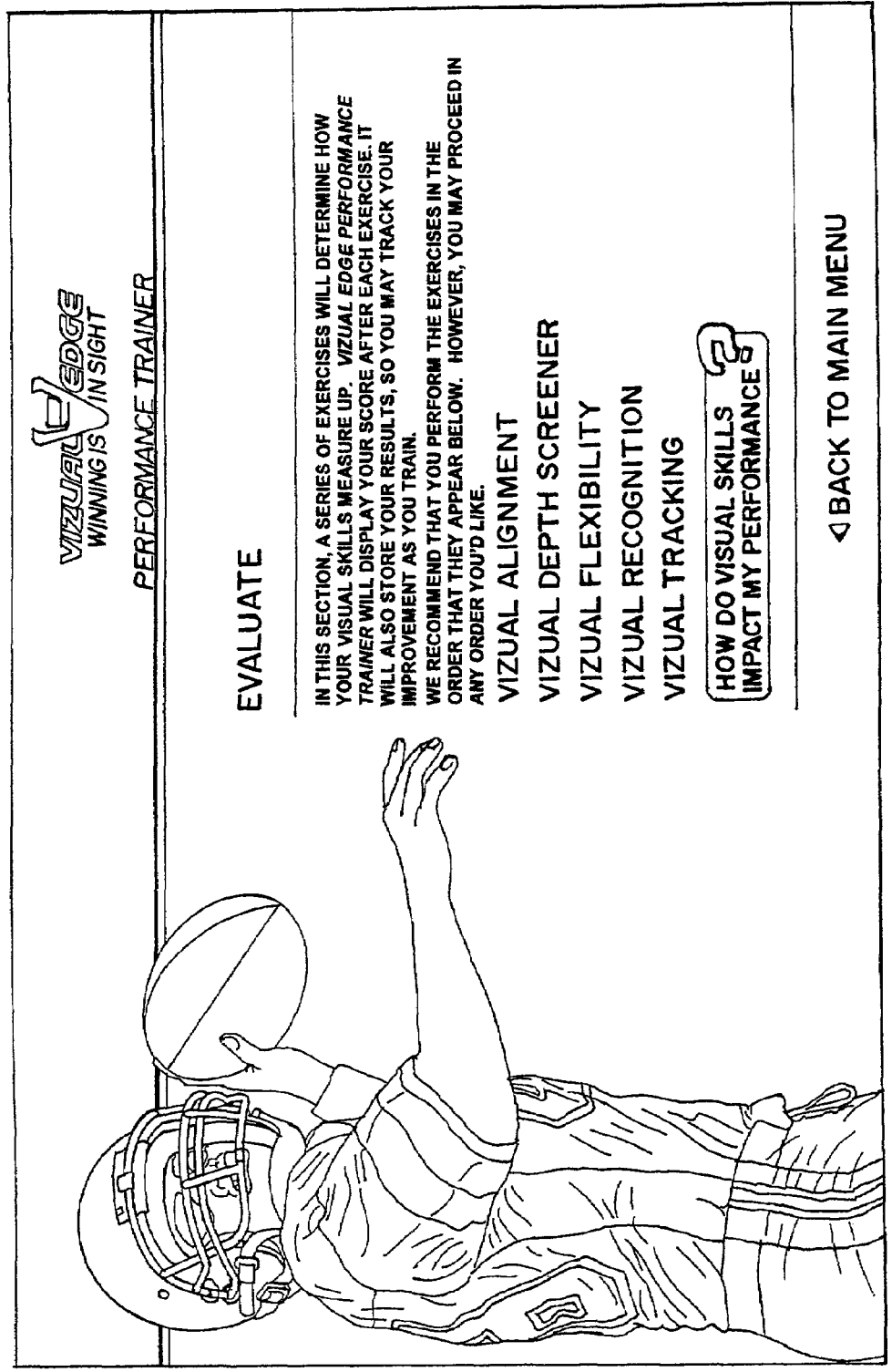
FIG. 3 is a screen shot of the "evaluate" menu from the link from the main menu of FIG. 2.

Evaluation:

FIG. 2 discloses a screen shot of a main menu for use with the system of the present invention. Once the user has logged on (this may include providing a password or other typical logging on procedures), the user is preferably directed to this screen. To begin evaluating the user's visual skills, the user clicks on the "evaluate" icon on the menu. The "evaluate" icon links the user to the evaluate menu shown in FIG. 3.

The evaluation portion 16 of the program includes a plurality of exercises to measure specific aspects of the user's visual skills. Preferably the exercises test the user's visual alignment, depth perception, flexibility, recognition, and tracking. Other exercises may, of course, be added or substituted. Icons (or other links) are provided to enable the user to proceed to the various exercises. The program analyses the responses provided by the user (via the keyboard, joystick or other controller) during each exercise and provides an appraisal of the user's visual skill. This may be in the form of a number or other indication of the user's performance. The calculations for such analysis are typically straightforward, usually involving determining the number of correct responses. The program can include messages providing further appraisal, wherein the message selected may depend on the number of correct responses to the exercise or other relevant criteria.

The visual alignment exercise 24 determines the user's level of eye alignment. Most people's eyes, including athletes' eyes, do not line up exactly on a target they believe they are looking at it. When this happens, the brain actually receives inaccurate information which affects the individual's ability to react appropriately to the target.

The preferred visual alignment exercise 24 requires the use of special glasses to assist in providing the required visual effect. In this regard, the system may include a pair of glasses 26 having a red lense for one eye (e.g., the right eye) and a blue lense for the other eye (e.g., the left eye).

Figure 4:
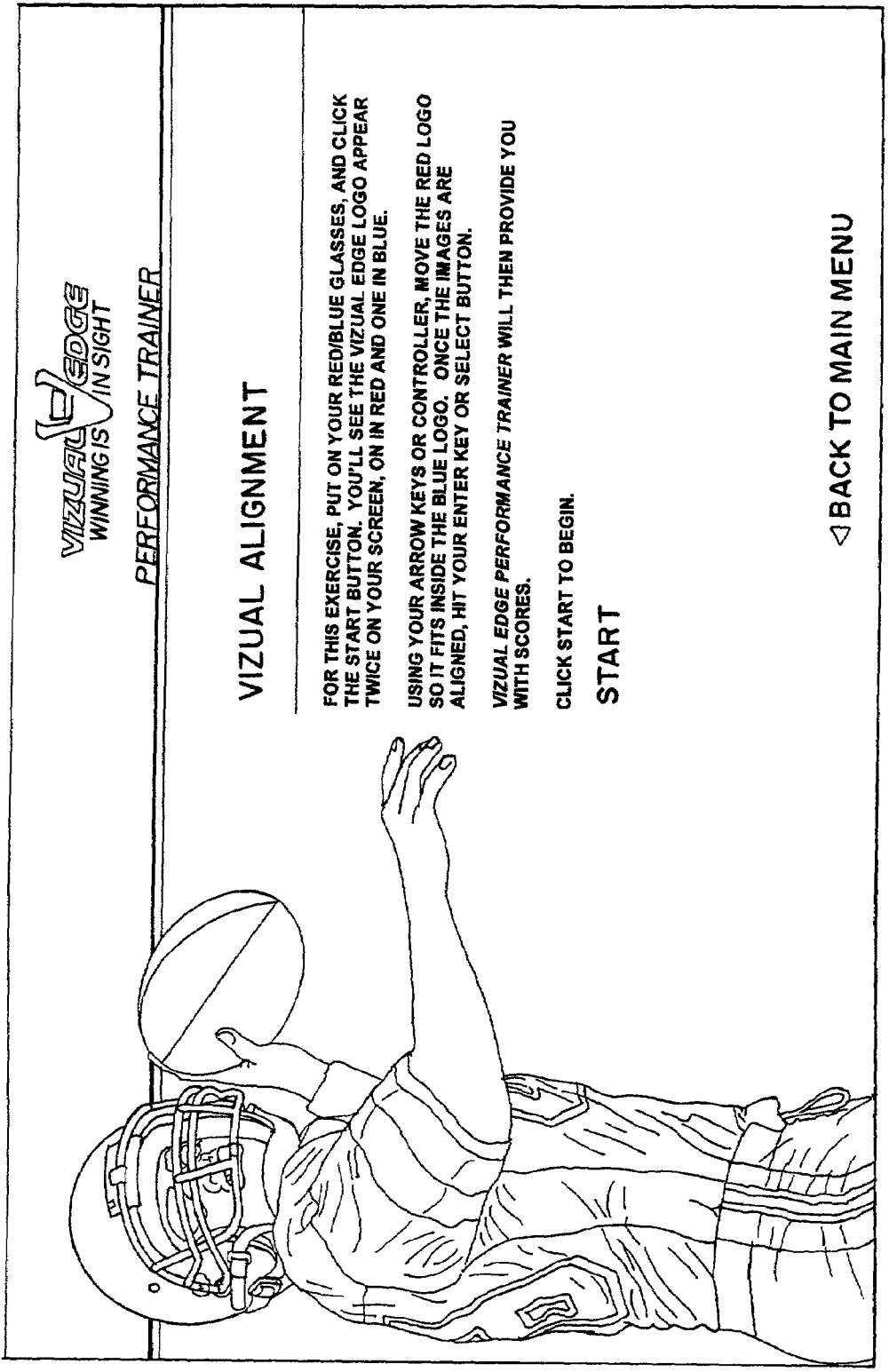
FIG. 4 is a screen shot of an instruction and start screen for use with a visual alignment exercise for the evaluate portion of the system.
Figure 5:
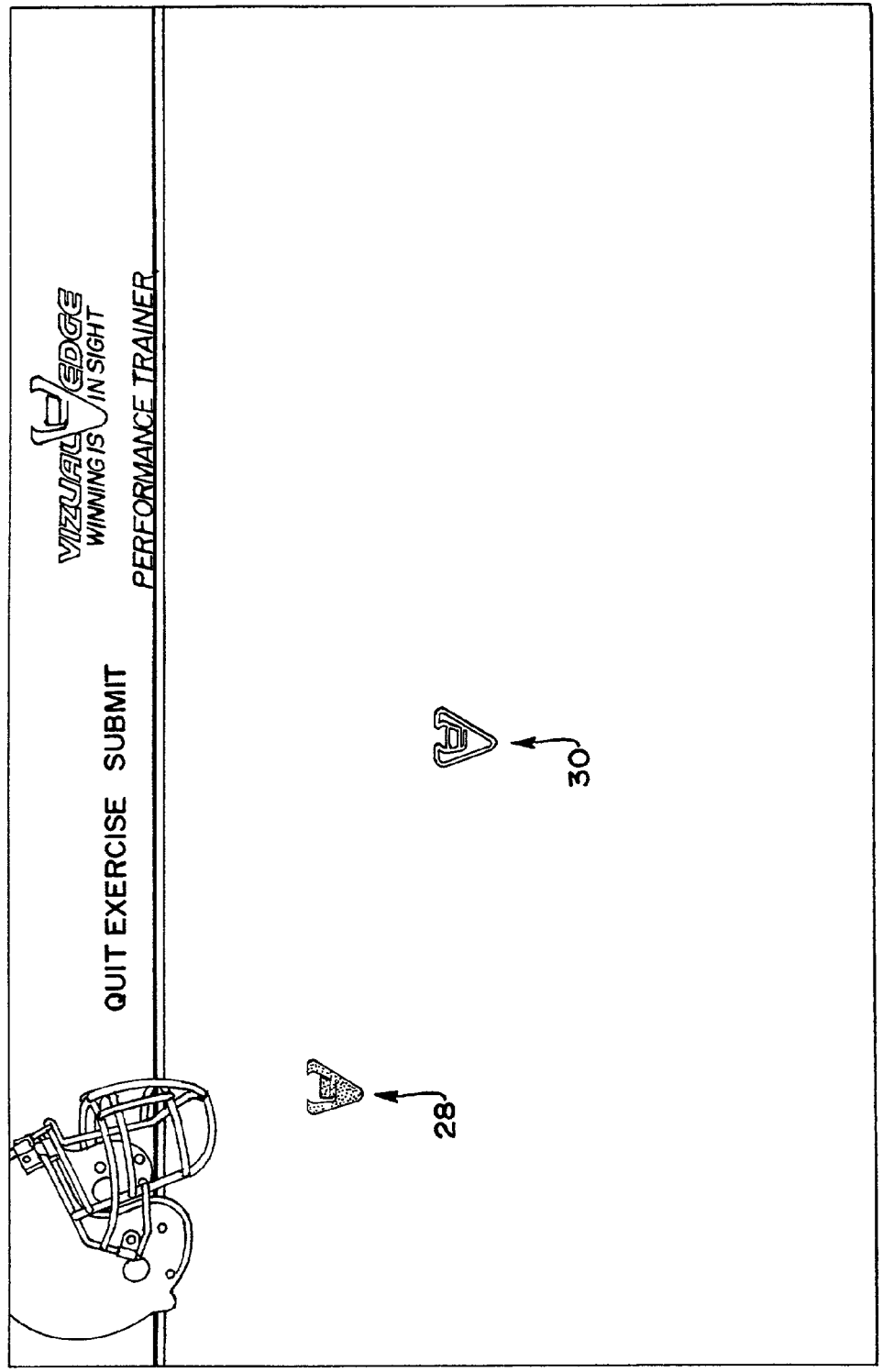
FIG. 5 is a screen shot of the visual alignment exercise referenced in FIG. 4.
Figure 6:
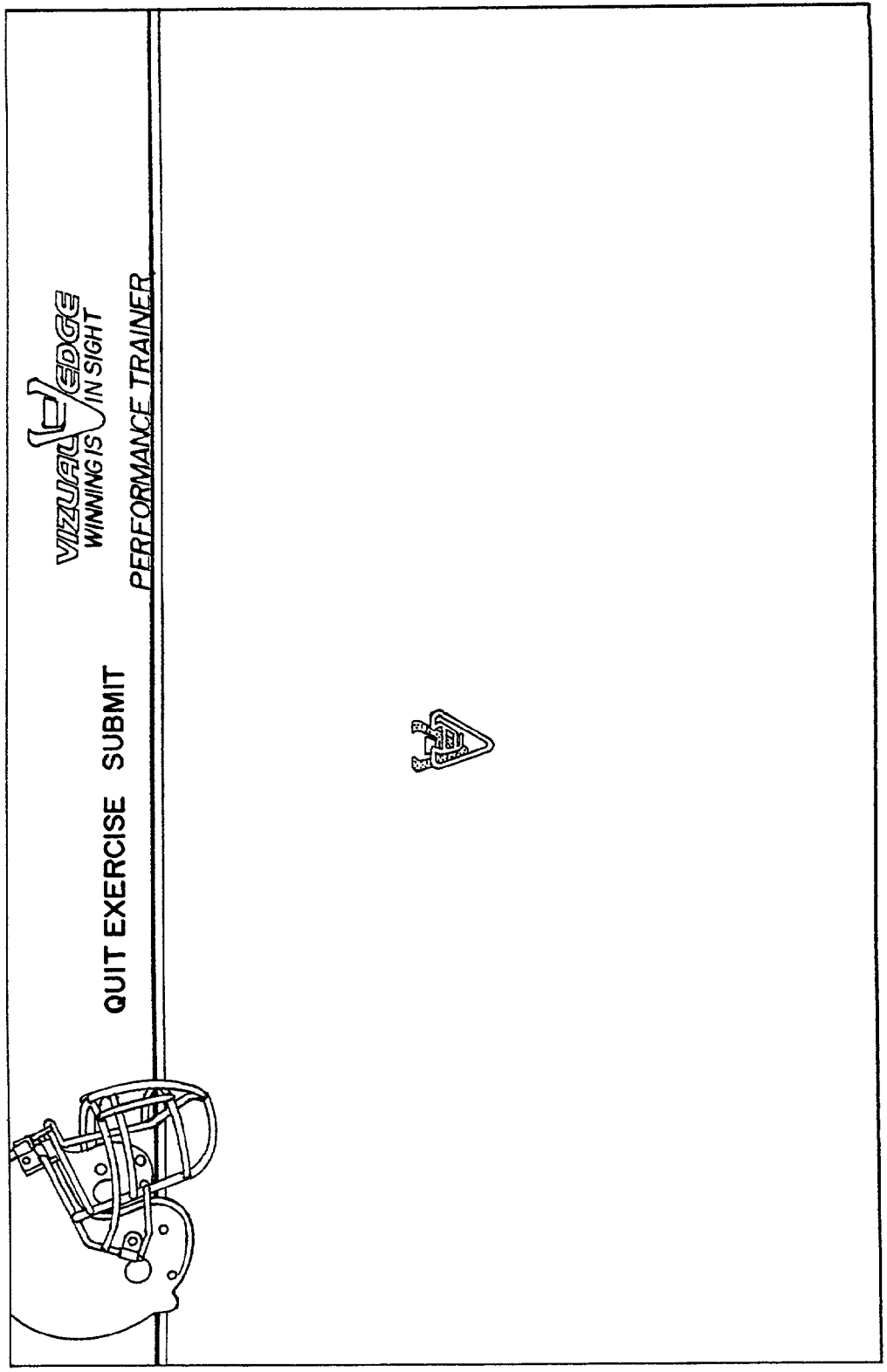
FIG. 6 is a further screen shot of the visual alignment exercise referenced in FIG. 4.

To begin the exercise, the user selects the "visual alignment" icon from the evaluate menu (shown in FIG. 3) which directs the user to a "Start" prompt and provides instructions on performing the exercise as shown in FIG. 4. Clicking on "Start" provides a screen as shown in FIG. 5. The exercise includes a first object 28 and a second object 30 that appear at separate locations on the computer screen. Both objects 28, 30 are the same shape, but are different colors on the screen. Specifically, one of the objects is red and the other is blue. With the red/blue glasses on, the user utilizes the arrow keys or controller to move the first object 28 until the user perceives that it overlaps the second object 30 (one on top of or above the other). FIG. 6 shows the first object 28 substantially overlapping the second object 30 (as perceived by a user manipulating the first object 28 with the arrow keys or joystick). The second object 30 remains stationary during this process. The user will only be able to see the red object with the right eye (through the blue lense) and the blue object with the left eye (through the red lense).

Figure 7:
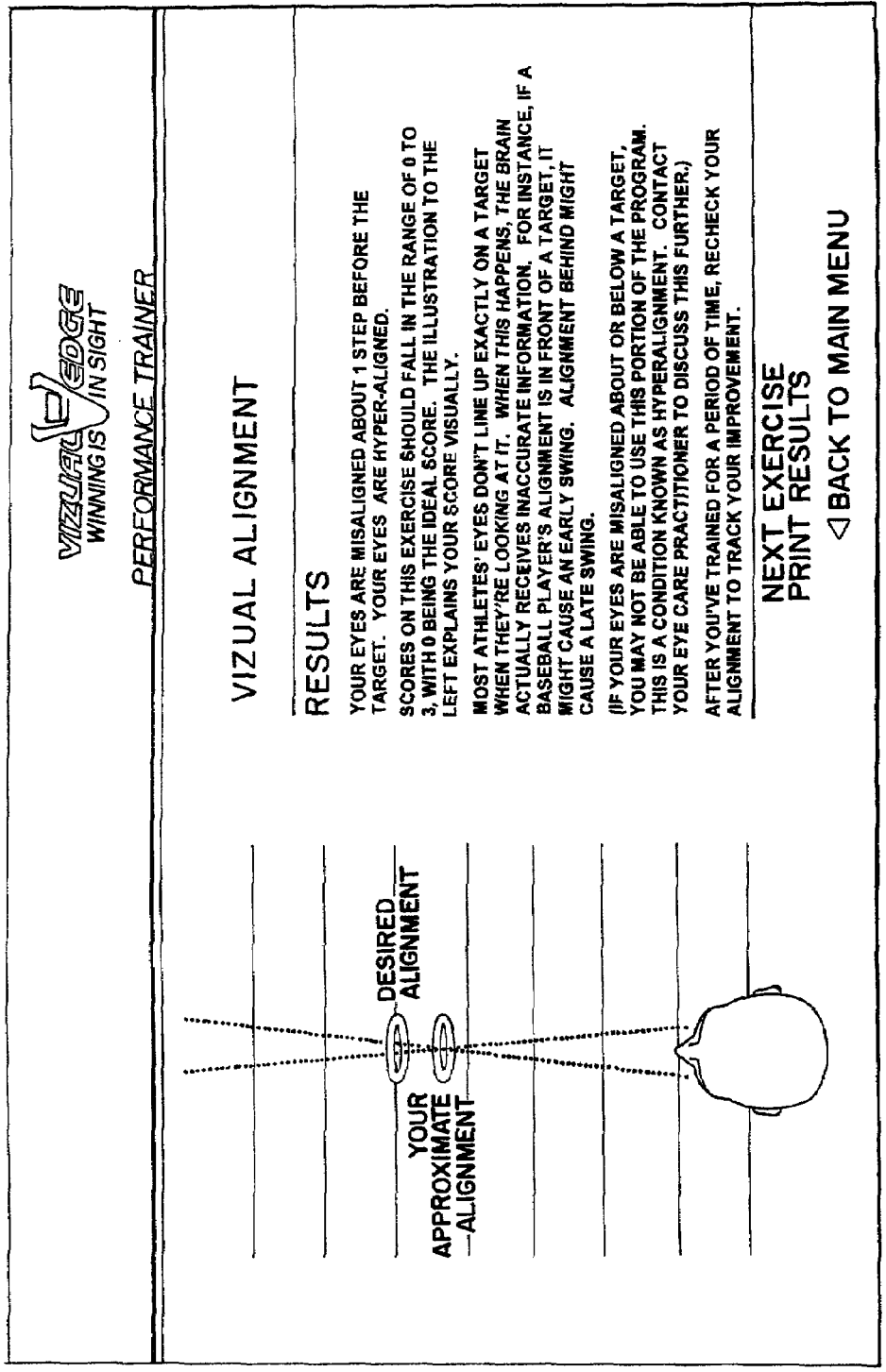
FIG. 7 is a screen shot of the results of the visual alignment exercise of FIGS. 5 and 6.

Once the objects are aligned or overlap (as perceived by the user), the user hits the enter key on the keyboard, or clicks "Submit" with the mouse. A graphic image, as shown in FIG. 7, will display the results and illustrate the alignment of the user's eyes. A numerical score is also provided. This score is maintained in a database for later comparison. Upon completion of the exercise, the user can return to the evaluation portion 16 of the program to move to the next exercise.

Figure 8:
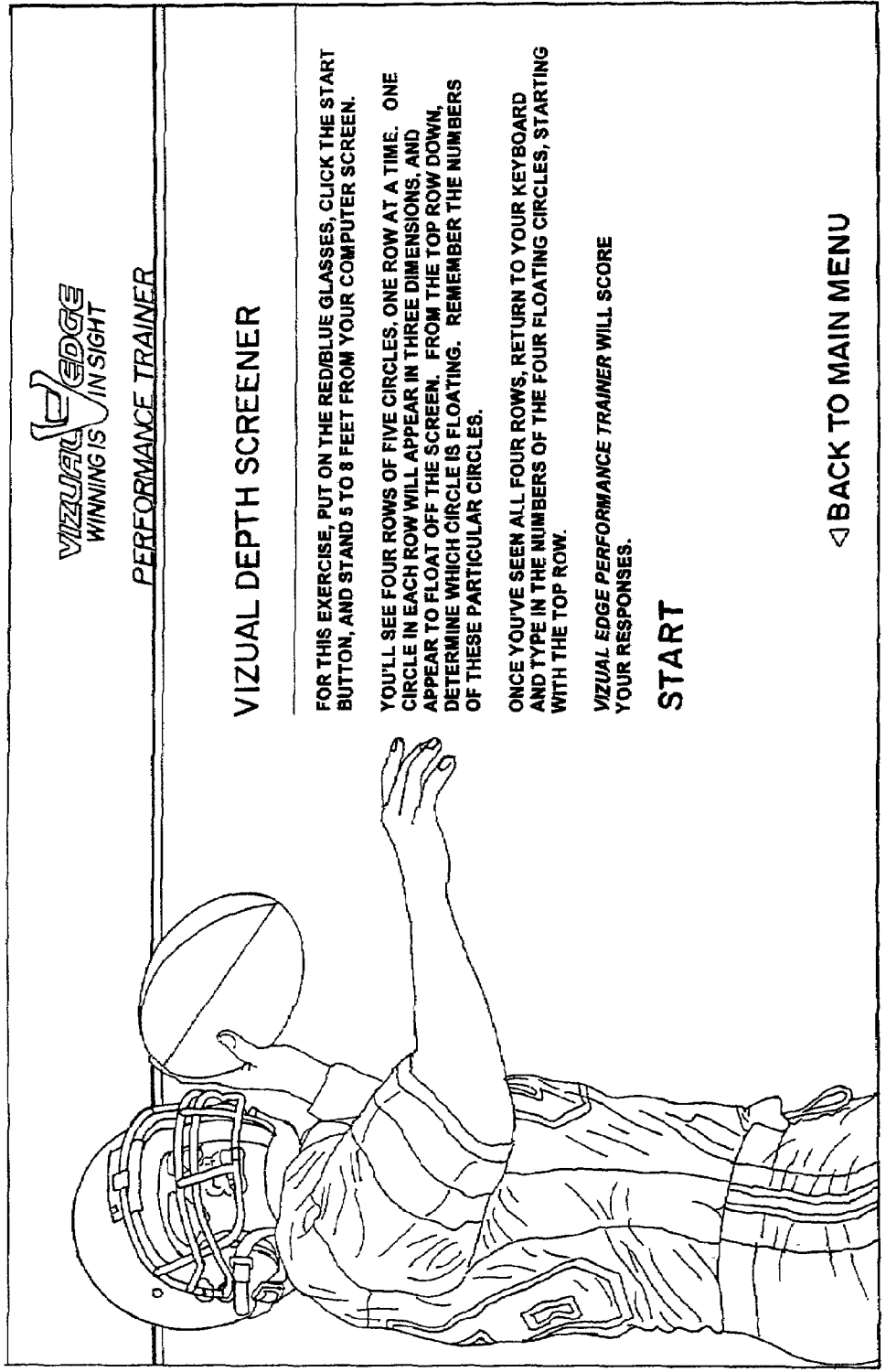
FIG. 8 is a screen shot of an instruction and start screen for a visual depth exercise for the evaluate portion of the system.
Figure 9:
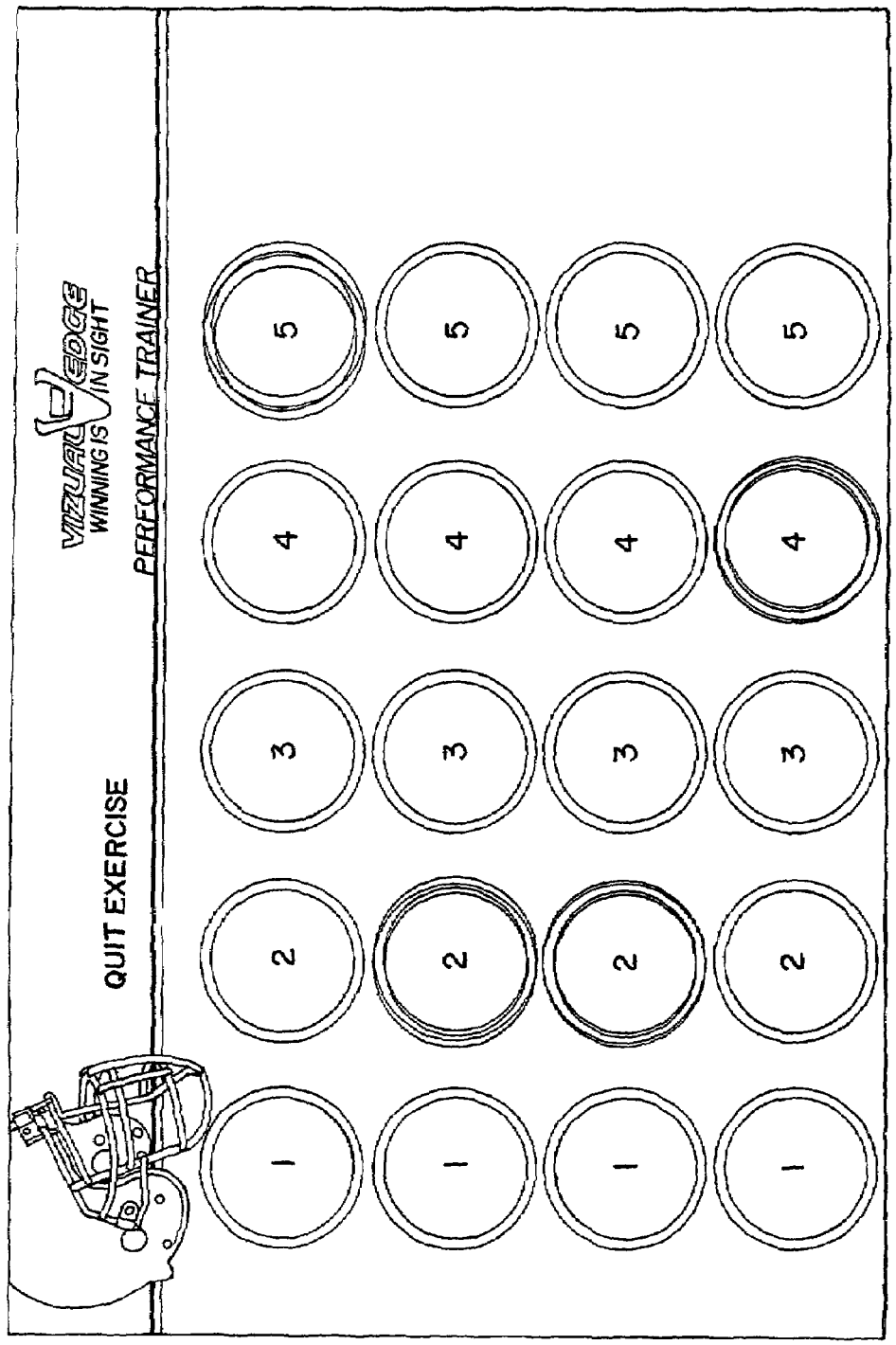
FIG. 9 is a screen shot of the visual depth exercise referenced in FIG. 8.
Figure 10:
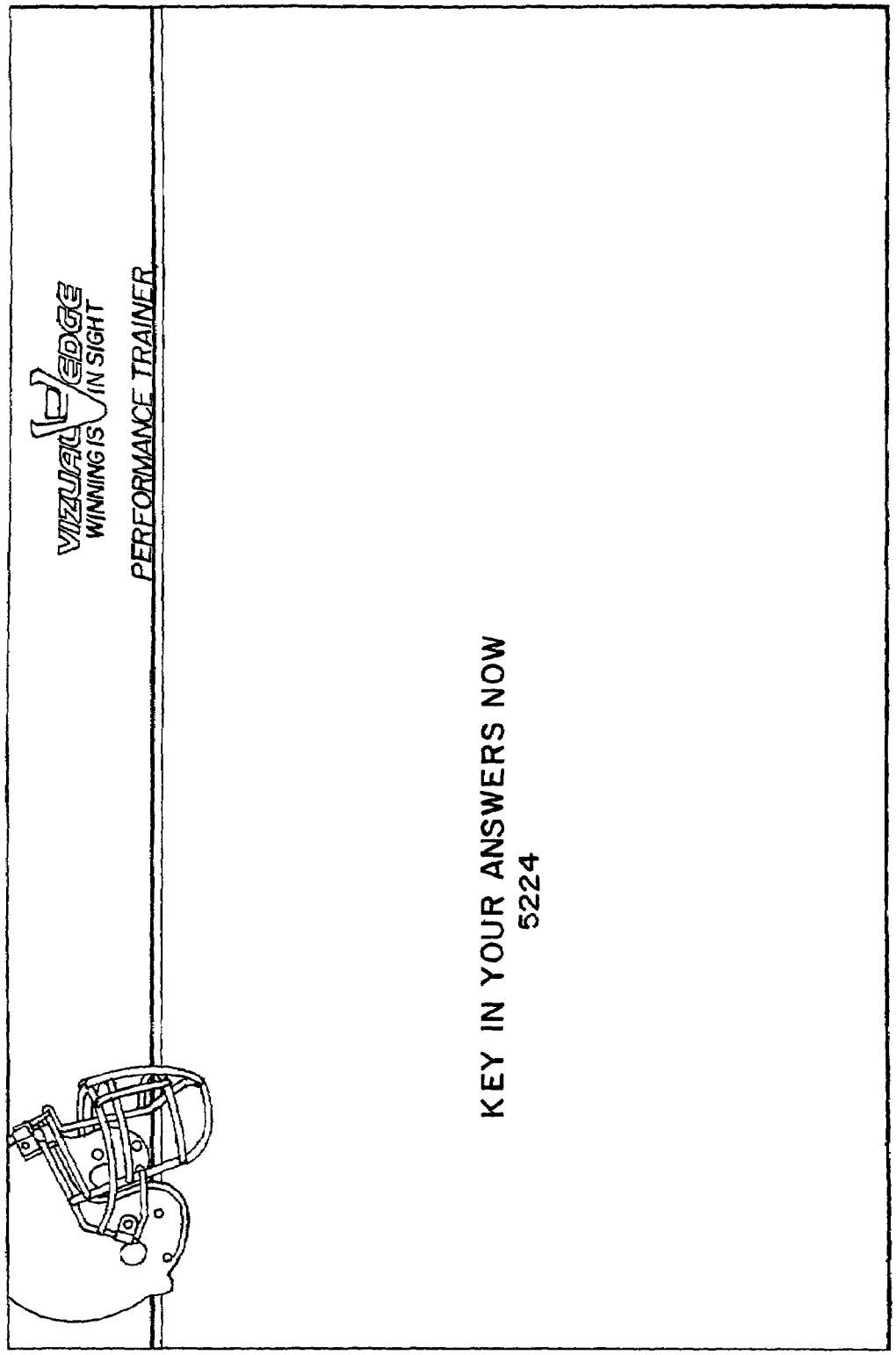
FIG. 10 is a screen shot of a response to the visual depth exercise of FIG. 9.
Figure 11:
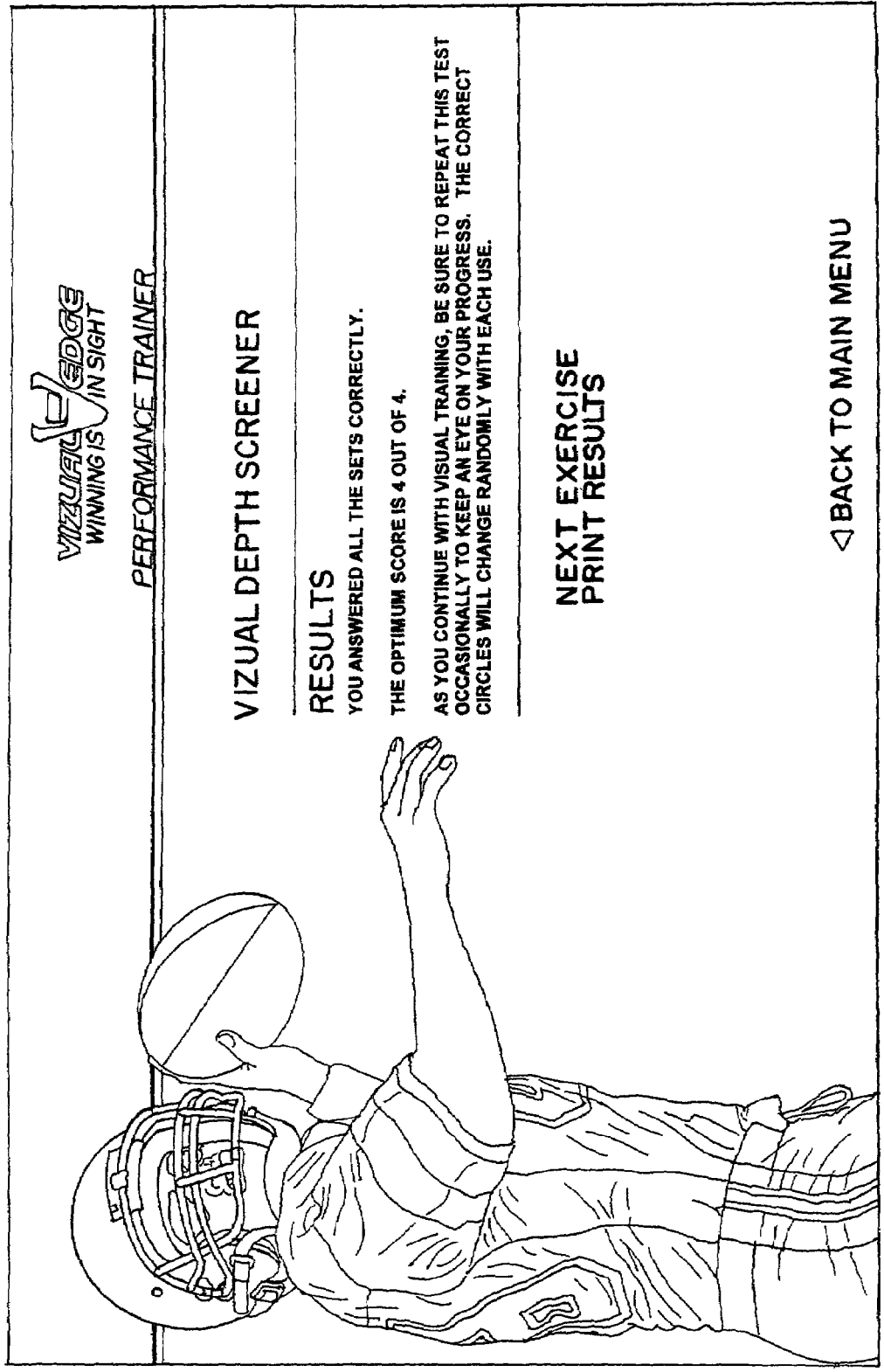
FIG. 11 is a screen shot of the results of the visual depth exercise of FIG. 9.

A second exercise 32 measures the depth perception of the user. This depth perception exercise 32 also requires use of the red/blue glasses. Referring to FIG. 8, the user clicks on the "Start" icon after reading the exercise instructions. The exercise 32 then generates four rows of circles on the computer monitor as shown in FIG. 9. Each circle in each row is numbered (in this instance each row is numbered 1 through 5). In each row one of the circles will appear to float (i.e., in three dimensions) off the screen. Following a short time interval, the user is prompted to input (starting from the top row and moving downward), using the number keys on the keyboard, what the user perceives is the number of the circle that is floating in each row (FIG. 10). The results are then displayed as shown in FIG. 11. Each time this exercise is utilized, the program will randomly select which circle in each row is floating.

Another exercise 34 tests the visual flexibility of the user's eyesight. Eye flexibility requires the user to move the user's eyes together simultaneously and efficiently. There are three distinct skills that make up visual flexibility: convergence (the ability of the eyes to maintain an inward posture); divergence (the ability of the eyes to maintain an outward posture); and alternating flexibility (the ability of the eyes to alternate between an inward and an outward posture). The visual flexibility exercise 34 in the evaluation portion of the program provides a baseline score for the user's convergence and divergence (as set forth below, the training portion of the program allows the user to train the user's alternating flexibility in addition to just convergence and divergence exercises).

Figure 12A:
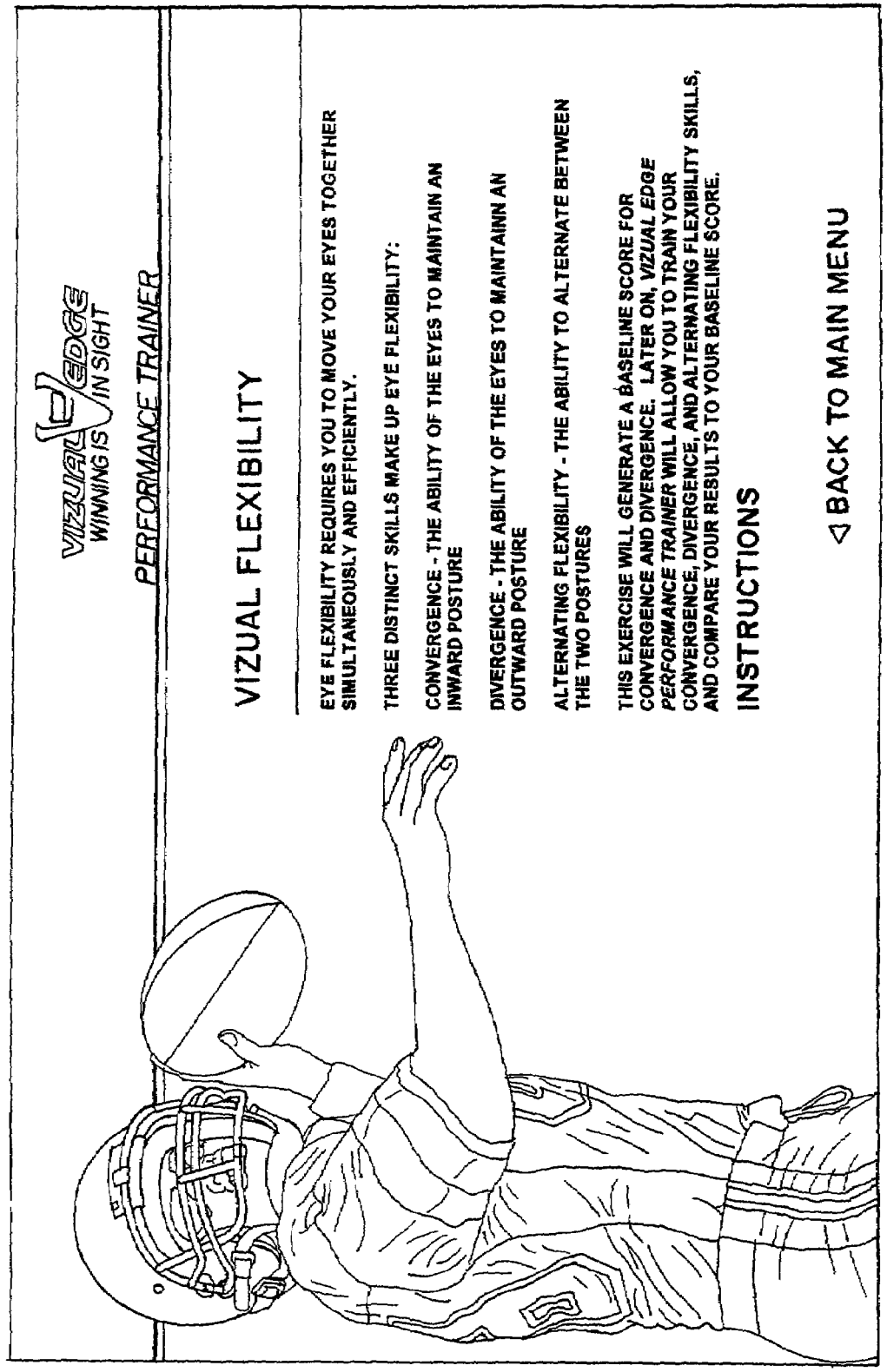
FIG. 12A is a screen shot of an instructions screen for a visual flexibility exercise.
Figure 12B:
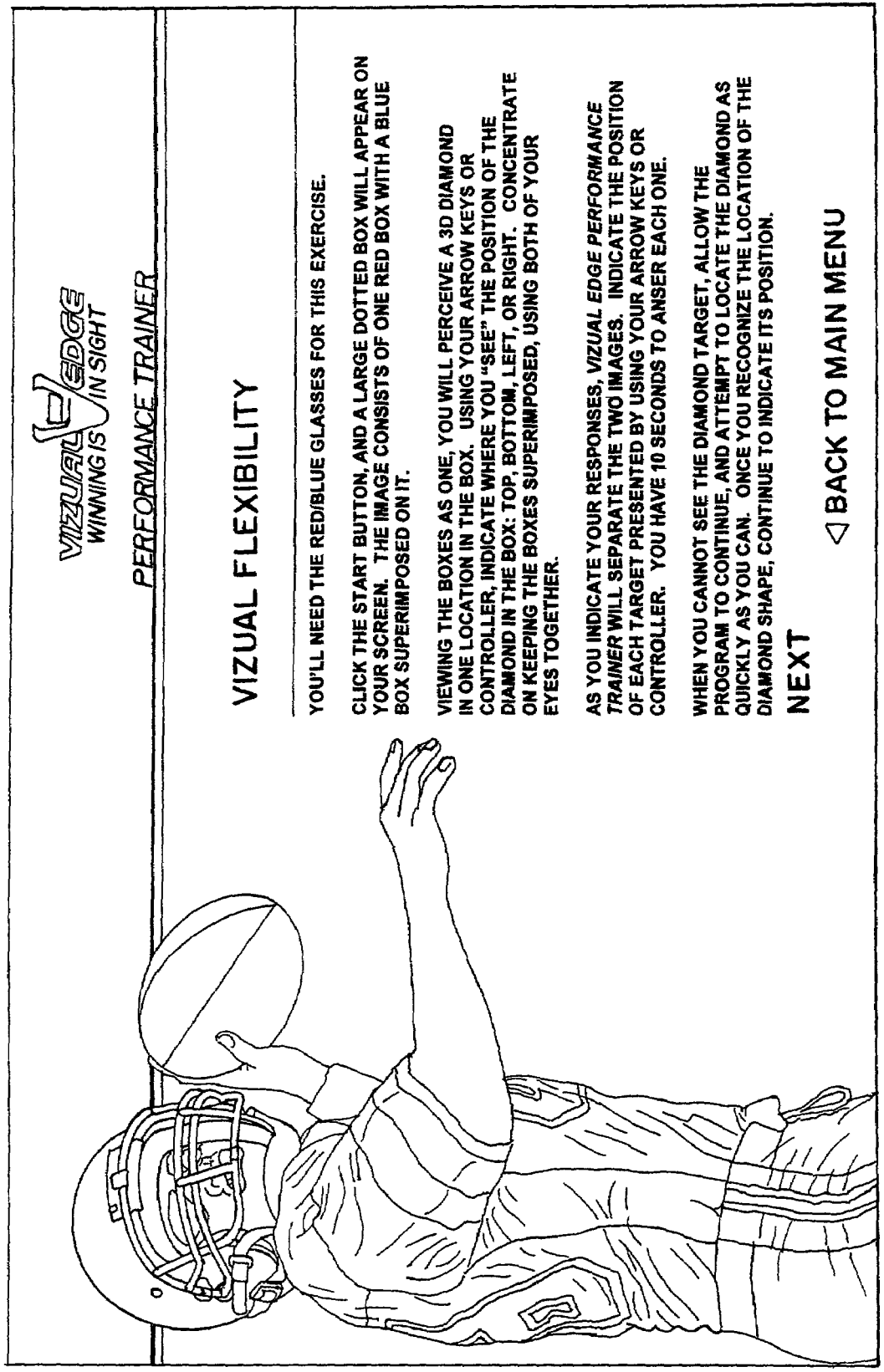
FIG. 12B is a screen shot of a further instructions screen for a visual flexibility exercise.
Figure 12C:
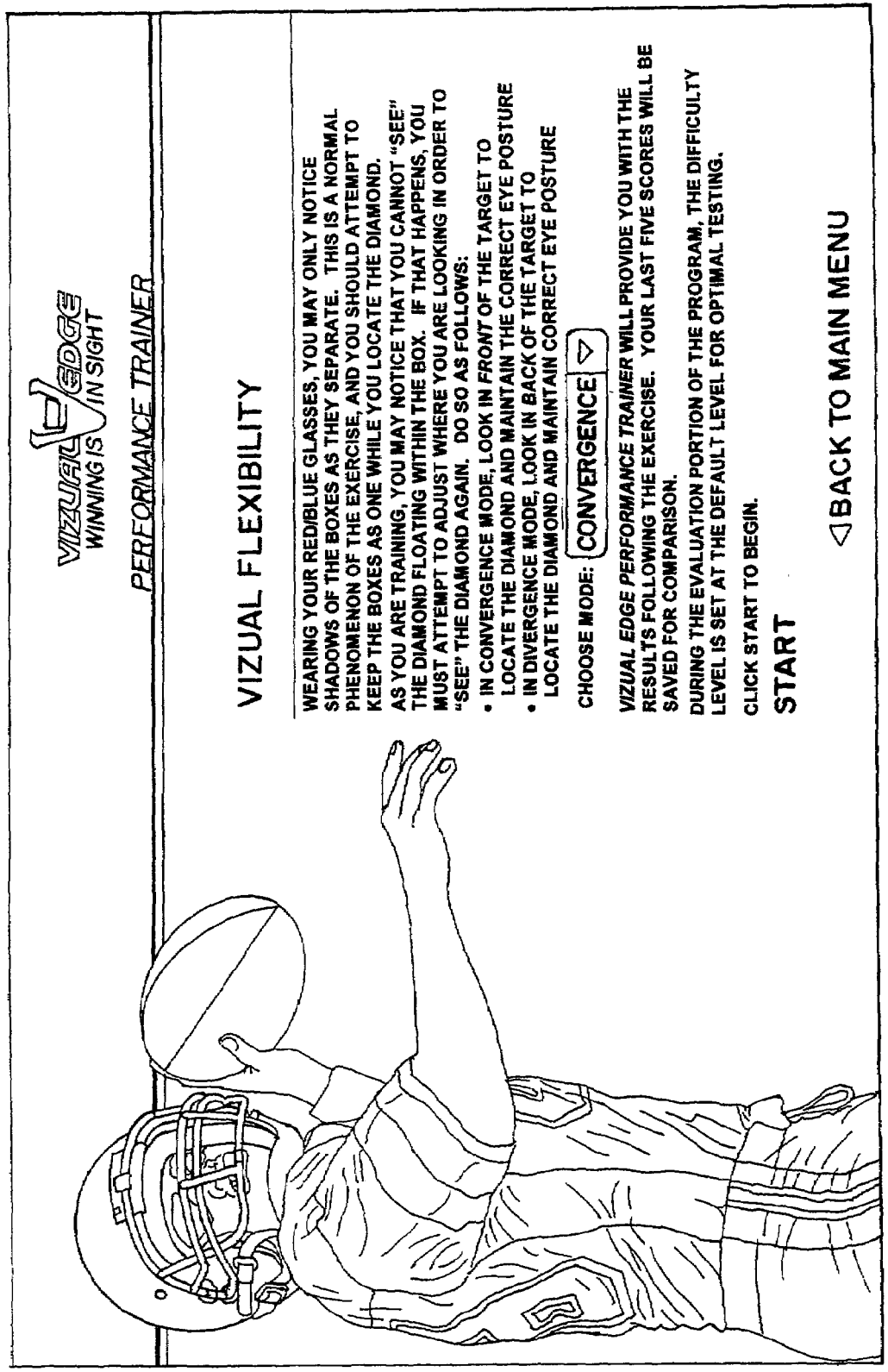
FIG. 12C is a screen shot of an instructions and start screen for a visual flexibility exercise.

Referring to FIGS. 12A-C, the user initiates the exercise by clicking on the "Start" icon after reading the instructions. Again, the red/blue glasses are required to utilize this exercise. A red box 36 and a blue box 38 superimposed on each other will appear on the computer monitor as shown in FIG. 13. The user, by concentrating on keeping the boxes superimposed (by using both eyes together), will perceive a three dimensional shape 40 (in this instance a diamond) located in a portion of the box (e.g., top, bottom, left or right side). Using the arrow keys on the keyboard, or a controller, the user indicates the location of the diamond in the superimposed boxes. A positive or negative sound can be generated for accurate and inaccurate responses, respectively. After the user responds, the exercise will separate the two boxes (FIG. 14) and require the user to respond again. This is repeated until the user can no longer see the diamond.

Figure 15:
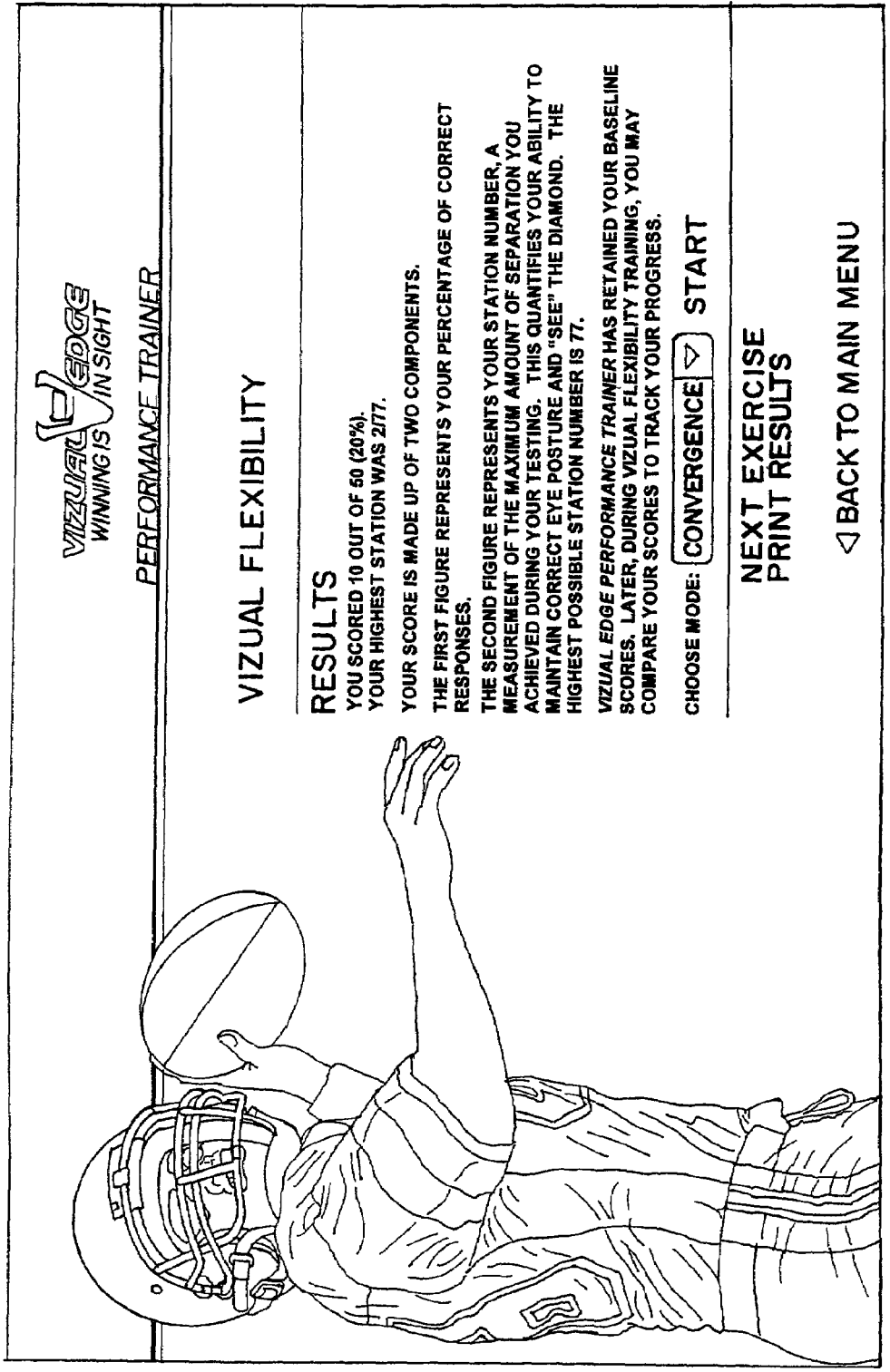
FIG. 15 is a screen shot of a results screen for the visual flexibility exercise of FIGS. 13 and 14.

The user can test in either the convergence mode first, or the divergence mode first. In the convergence mode, each successive turn the red box moves slightly to the user's left and the blue box moves slightly to the user's right. In contrast, in the divergence mode the red box moves slightly toward the user's right and the blue box moves slightly toward the user's left. Again, the results are displayed on the monitor following the exercise (FIG. 15).

Figure 16:
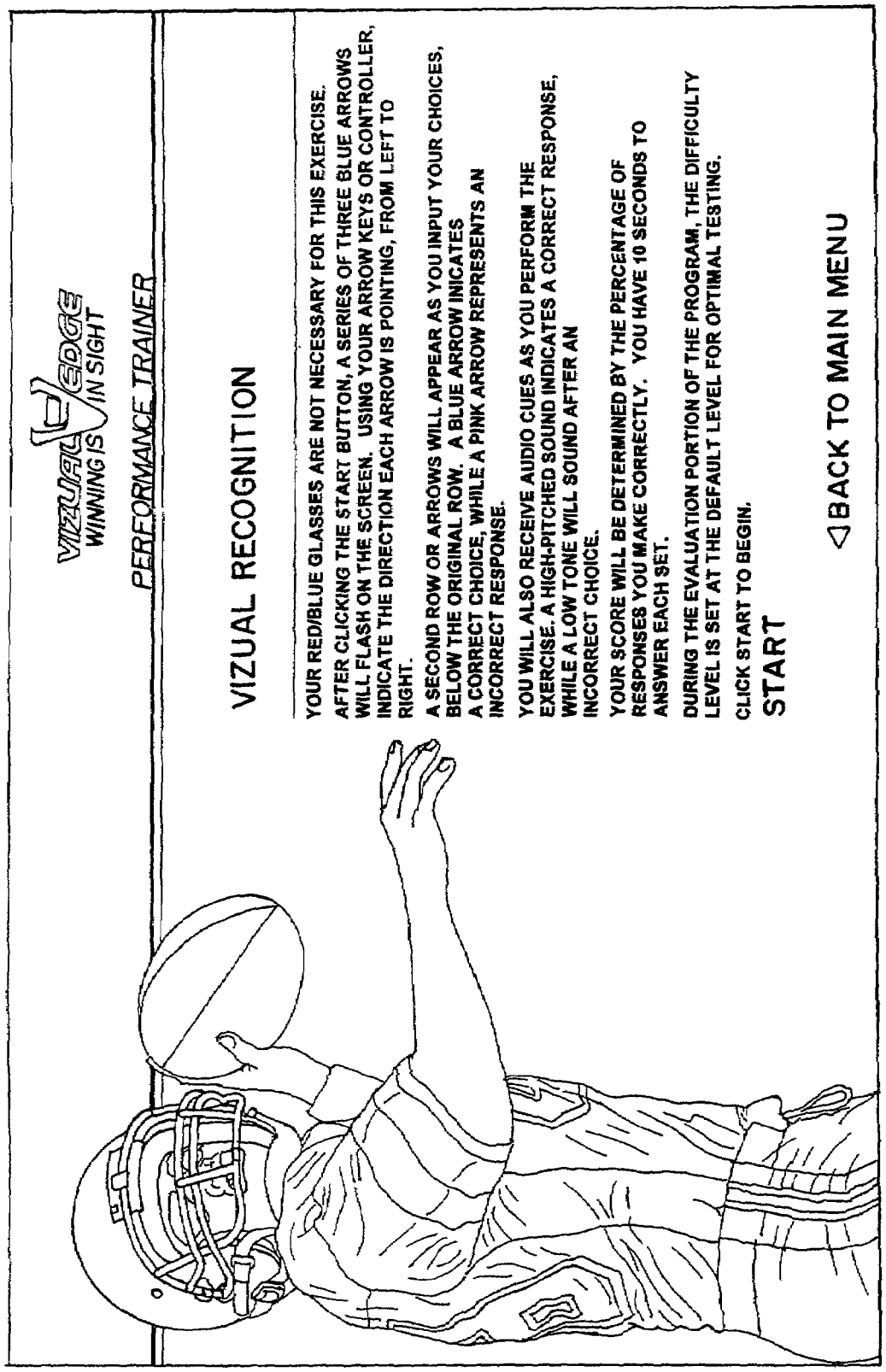
FIG. 16 is a screen shot of an instruction and start screen for a visual recognition exercise.
Figure 17:
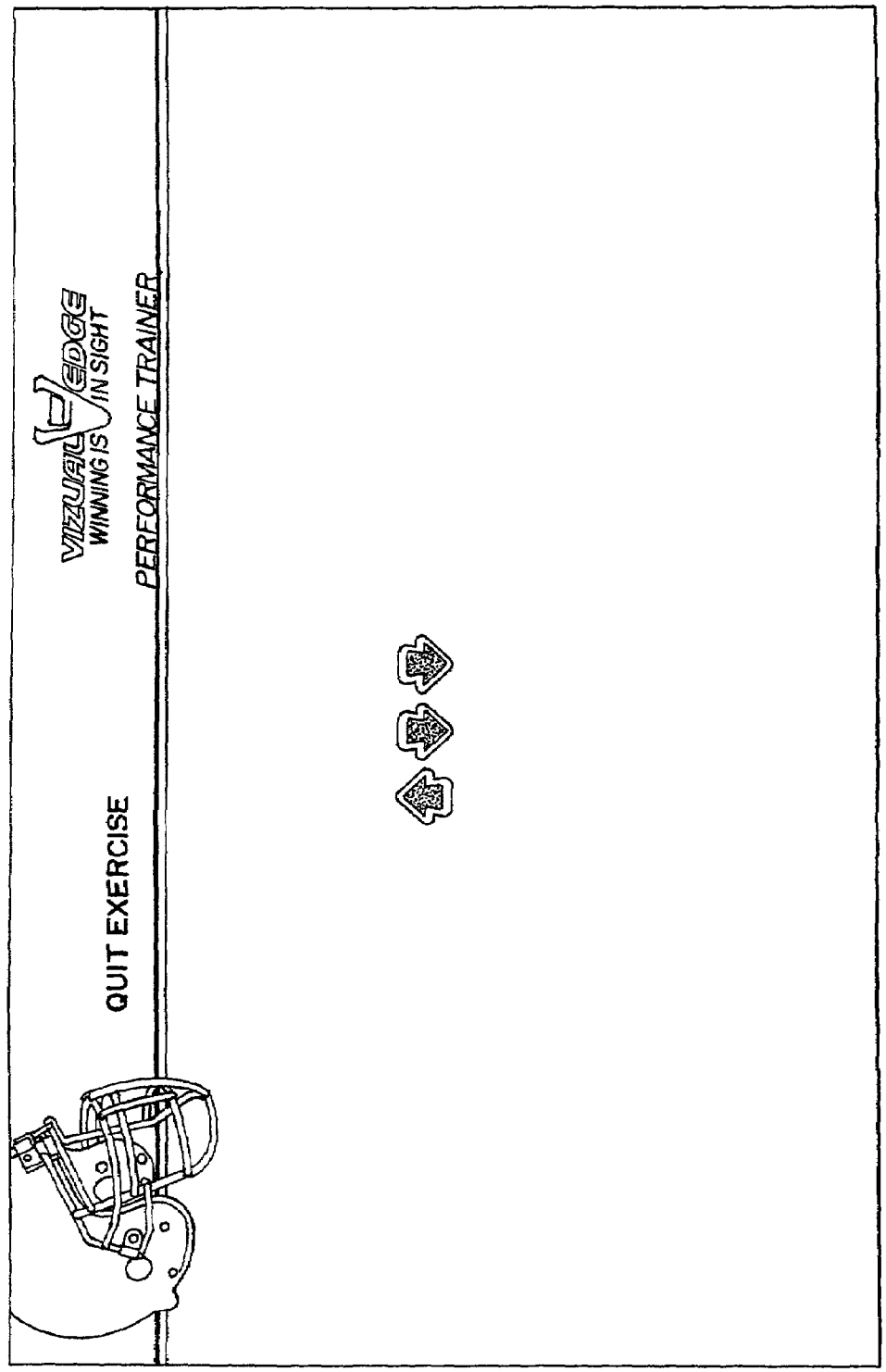
FIG. 17 is a screen shot of the visual recognition exercise referenced in FIG. 16.
Figure 18:
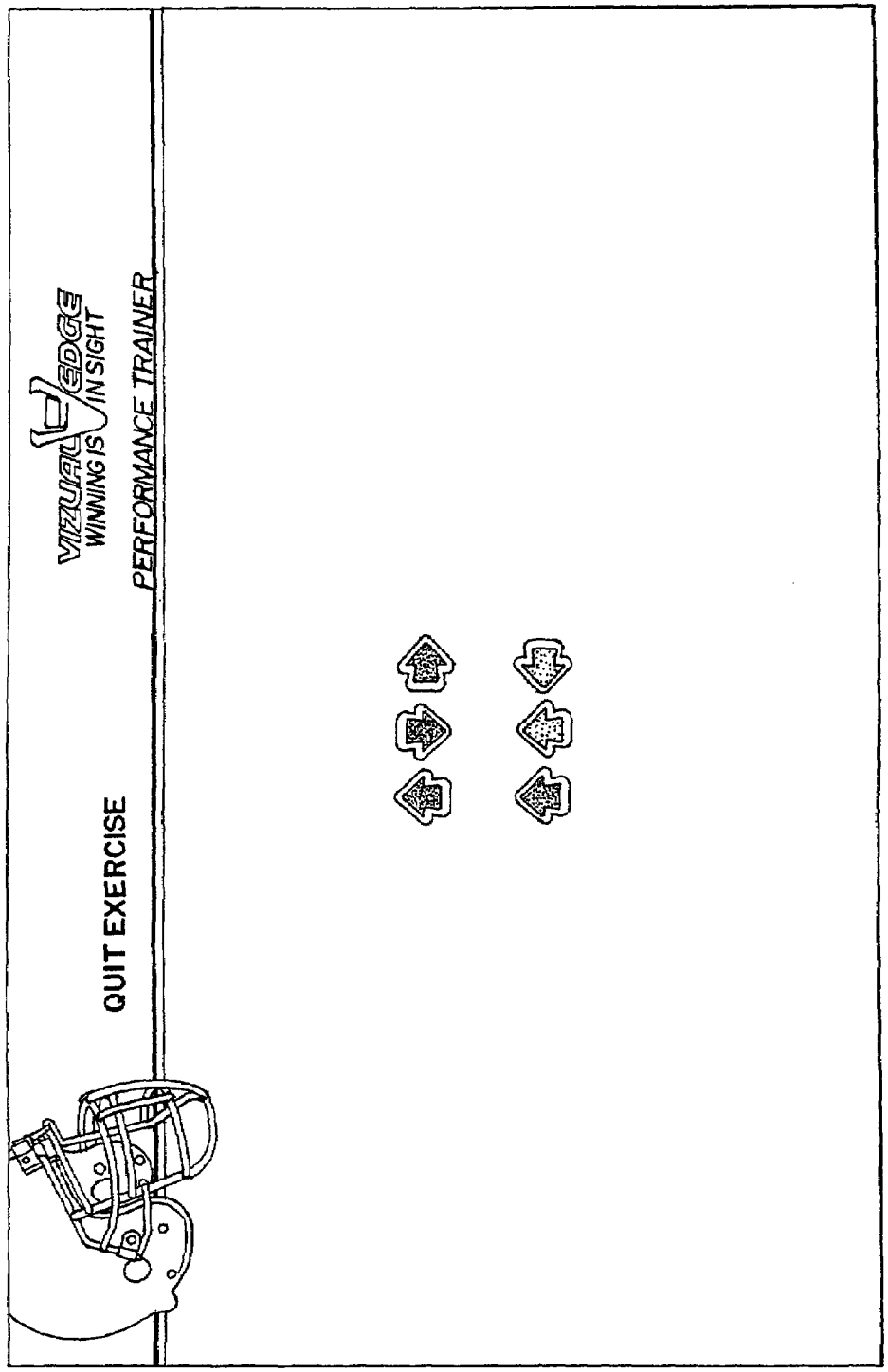
FIG. 18 is a screen shot of a response to the visual recognition exercise referenced in FIG. 16.
Figure 19:
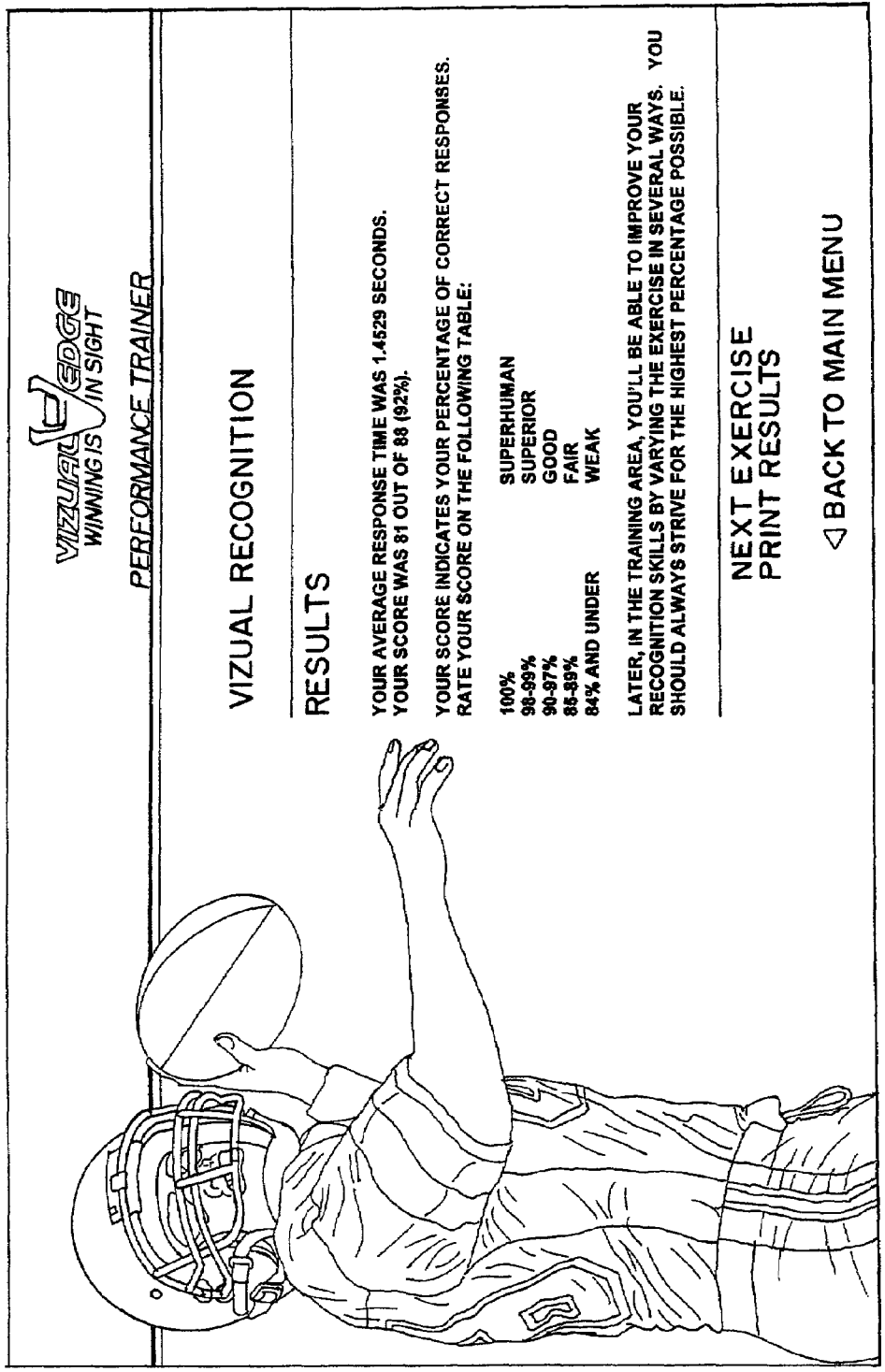
FIG. 19 is a screen shot of the results of the visual recognition exercise of FIGS. 17 and 18.

Another exercise 42 evaluates the user's visual recognition skills (see FIG. 16). In this exercise, a series of three arrows 44 (each randomly pointing either up, down, right or left) will flash across the screen for a very short interval of time as shown in FIG. 17. Using the arrow keys, the user inputs the direction of the arrows 46 (starting from left to right) that were previously displayed (see FIG. 18). As the user inputs each arrow, the original arrow will appear above the inputted one. When the user makes an incorrect choice, the inputted arrow will be displayed in a different color than the original arrow (or with some other visual indication that it is a wrong choice, e.g., an "x" over the choice). Additionally, an audible sound, such as a buzzer, can be used to indicate positive and negative results after each arrow is inputted. The arrow display is repeated for a certain length of time to get a baseline evaluation of the user's recognition skills. During this evaluation, the number of arrows, length of time on the screen, and length of the test are set to a default level (during training these parameters may be modified). The program will display the results following the evaluation as shown in FIG. 19. Scoring is based on both response time and accuracy.

Figure 20:
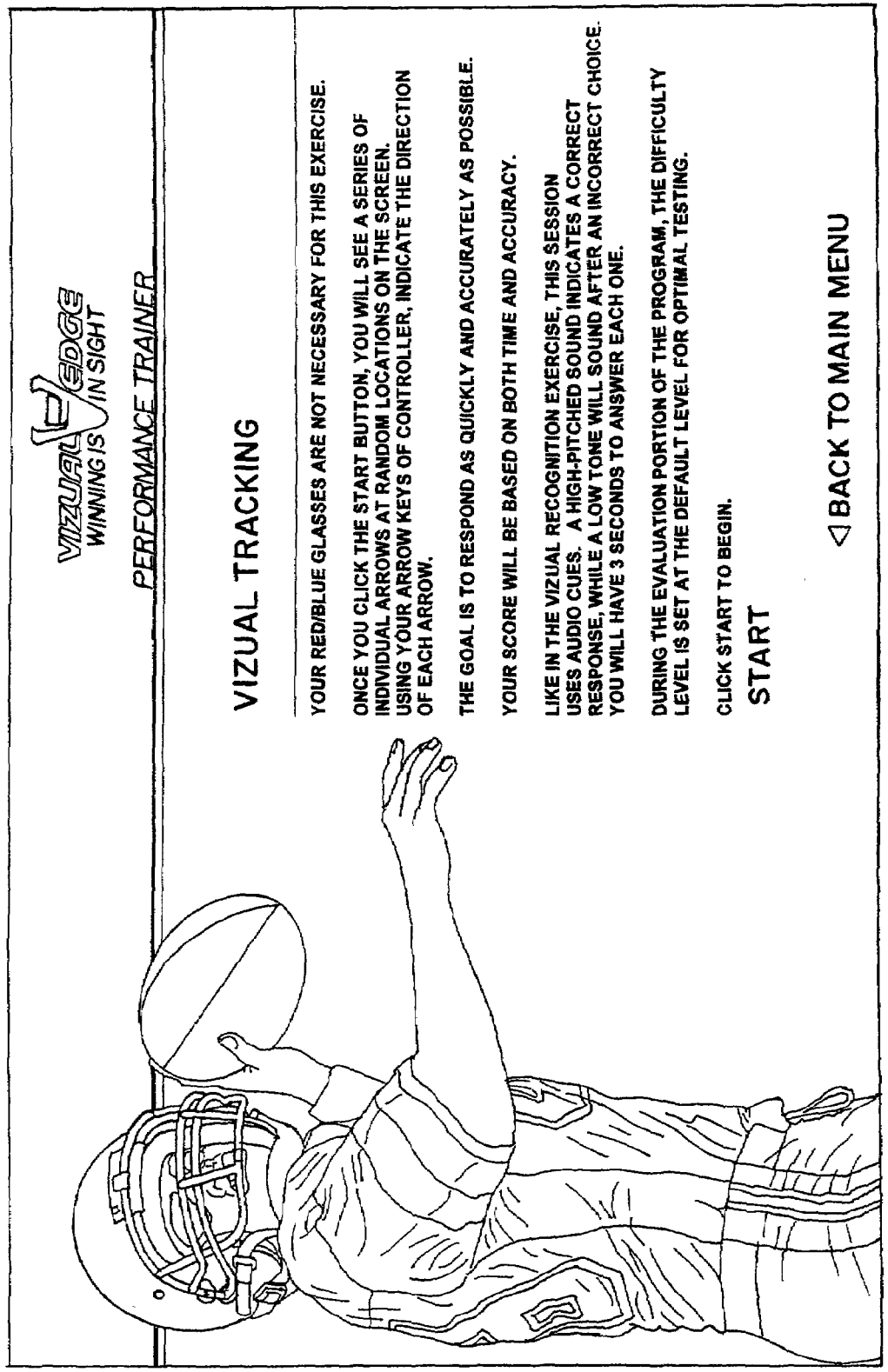
FIG. 20 is a screen shot of an instruction and start screen for a visual tracking exercise.
Figure 21A:
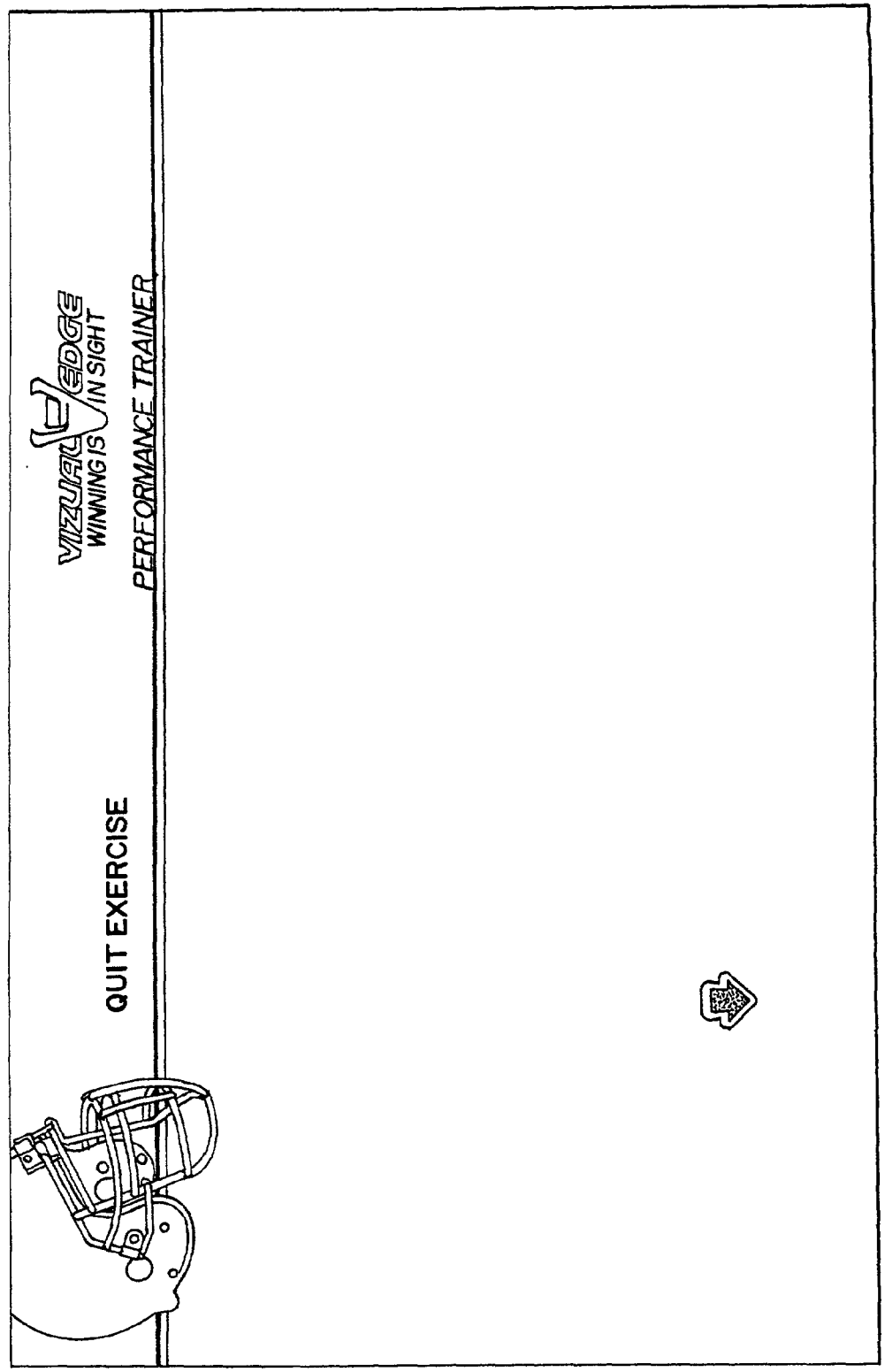
FIG. 21A is a screen shot of the visual tracking exercise referenced in FIG. 20.
Figure 22:
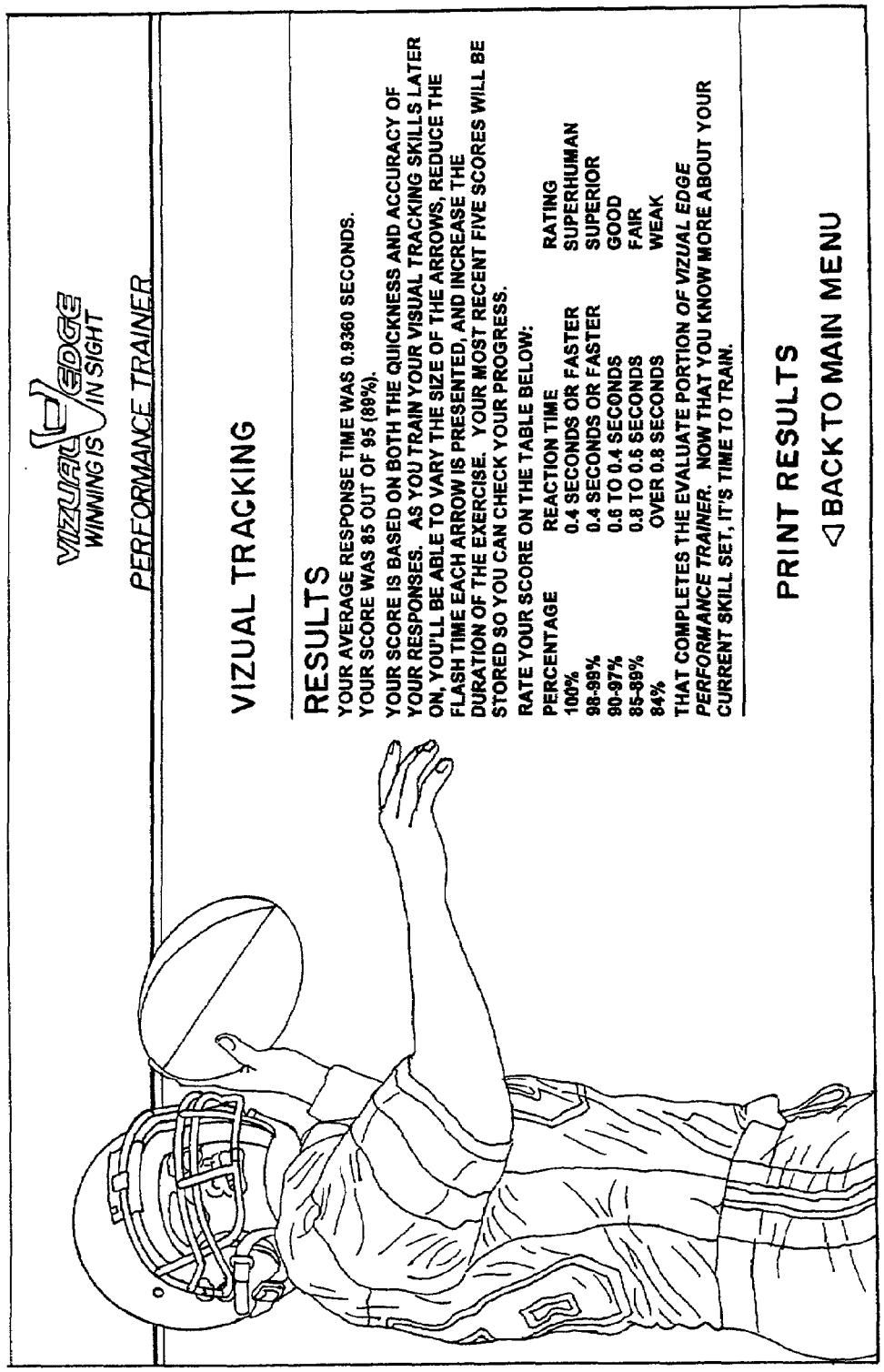
FIG. 22 is a screen shot of a results screen of the visual tracking exercise of FIGS. 21A and B.

Another exercise 48 evaluates the user's visual tracking skills (FIG. 20). In this exercise, an arrow 50 is briefly flashed in different locations of the computer monitor (see FIGS. 21A and B). The user inputs the direction of the arrow after each flash. The goal is to respond as quickly and as accurately as possible. Again, scoring is based on both response time and accuracy. Also, both visual and audio feedback is provided as the exercise is being performed. The results are displayed after completion of the exercise (FIG. 22).

Figure 23:
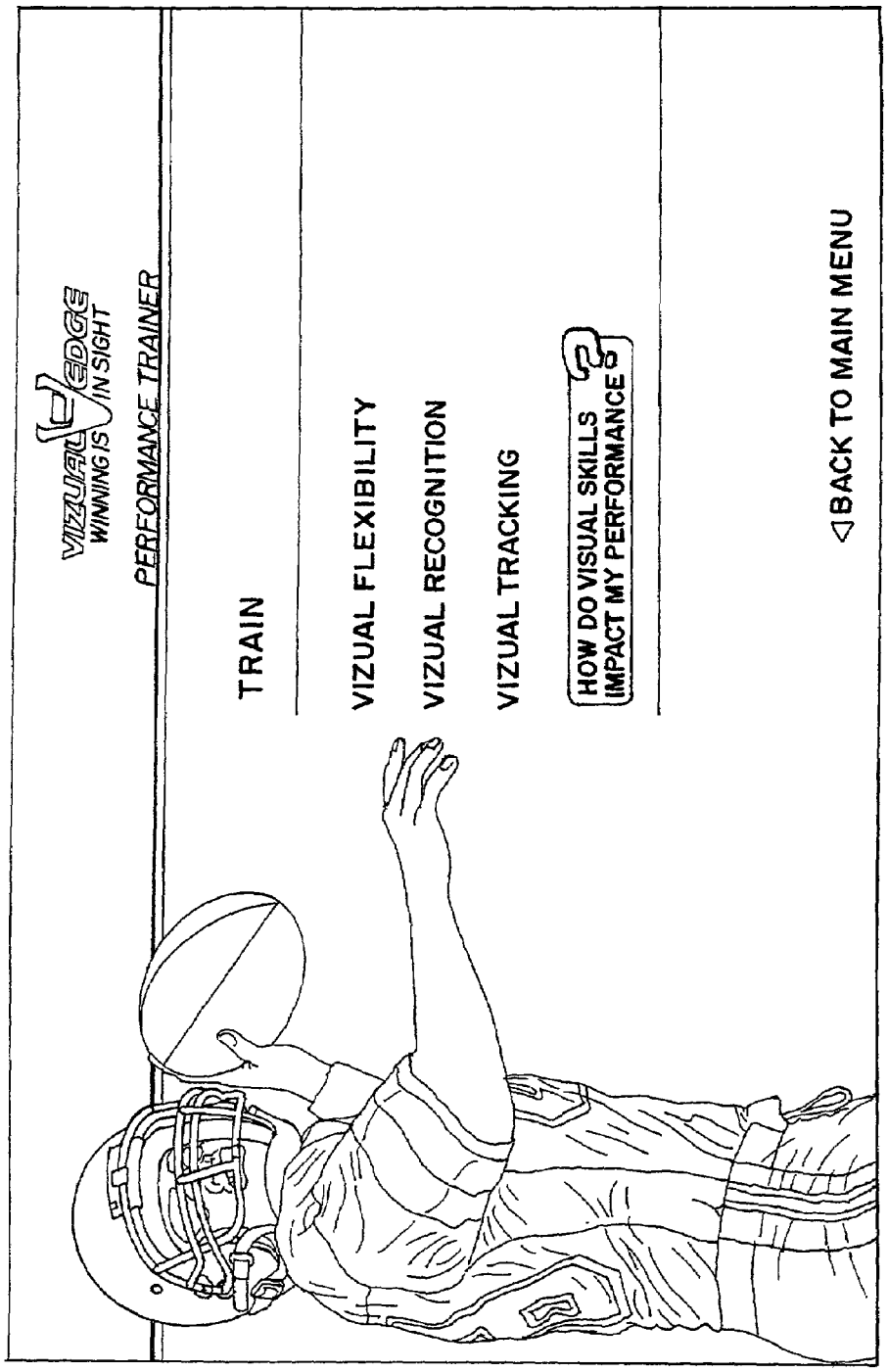
FIG. 23 is a screen shot of a "train" menu page.

Training:

After the evaluation exercises are completed, the user can proceed to train his or her visual skills by selecting an exercise from the training menu as shown in FIG. 23. The training menu (FIG. 23) is accessible through the "Train" link on the main menu (FIG. 2). The exercises performed during the user's evaluation, i.e., the flexibility, recognition, and tracking routines, can also be used for such training. Training the user's flexibility, recognition and tracking visual skills should also improve the user's alignment and depth perception.

The training version of the flexibility exercise 52 is similar to the evaluation exercise 34, except that the training version allows the user to vary certain parameters or settings in the exercise. Specifically, the user can change the box size (which changes the object, i.e. diamond, size) to either small or large. Additionally, the user can adjust the duration of the exercise and the difficulty level. The user can also select between convergence, divergence or alternating flexibility for the exercise 52. Again, audio feedback may also be provided.

The training version of the recognition exercise 54 is also similar to the evaluation exercise 42. Again, the user can vary settings to adjust the difficulty of the exercise. For example, the user can select the number of arrows that are flashed across the monitor (e.g., 3, 6, 9 or 12), the arrow size (e.g., small, medium or large), flash time (e.g., 0.3, 0.6, 0.9, 1.0, 2.0 or 3.0 seconds) and duration of exercise (e.g., 2, 5 or 10 minutes). Additionally, the user can display the arrows in one row or two rows and can turn the audio on or off.

Finally, the training version of the tracking exercise 56 is also similar to the evaluation exercise 48. Again, the user can vary the settings to adjust the difficulty of the exercise. The user may adjust the flash time (e.g., 0.1, 0.3, 0.6, 0.9, 1.5, or 2.0 seconds), duration of exercise (2, 5 or 10 minutes) and the size of the arrow (small, medium or large). Additionally, the user can turn the audio on or off.

The user can utilize the visual exercises at his or her own pace and adjust the difficulty in an appropriate manner. For instance, the user can gradually increase the difficulty of the exercises with each subsequent use.

Checking Progress:

Periodically, the user should retake the evaluation exercises and compare the results. The check progress portion 20 of the program displays the past results for comparison as shown in FIG. 24. The results can be printed on a standard printer.

The program can be modified to allow access to more than one user and to keep a database of each user's results.

While specific embodiments have been illustrated and described, numerous modifications are possible without departing from the spirit of the invention, and the scope of protection is only limited by the scope of the accompanying claims.

We claim:

1. A method of self-directed assessing and training a user's visual skills, comprising the acts of:

(a) using a computer program for use with a computer and a monitor, the computer program having a visual tracking computer routine, said visual tracking routine showing a directional indicator on the monitor pointing in a direction selected from the group of: up, down, left and right;

said directional indicator appearing and thereafter disappearing on said monitor a series of times;

said visual tracking routine further having said directional indicator appear at random locations on said monitor and pointing in a variety of directions in said series;

(b) the user interacting with said computer with a response control comprising arrows up, down, left and right on a keyboard, joystick and/or a game controller;

(c) the user selecting one of said arrows on said control following each appearance of said directional indicator;

(d) said visual tracking routine timing the reaction times from an appearance and/or disappearance of said first directional indicator until the user's subsequent response with said response control, said visual tracking routine data storing both said reaction times and the response accuracy of selecting directional indicators that correspond to said up, down, left and right series of directional indicators; and (e) showing feedback on the monitor to said self-directed user based on said reaction times and said accuracy of the user's having selected directional indicators.

2. The method of claim 1 wherein the act of providing feedback includes displaying the reaction times as an average visual tracking reaction time.

3. The method of claim 2 wherein the computer provides at least one audible sound to indicate upon selection the accuracy andlor inaccuracy of the user's visual tracking selections.

4. The method of claim 3 and further comprising the acts of:
(f) using said computer program, the computer program having a visual memory computer routine, said visual memory routine simultaneously showing more than one directional indicators on the monitor each pointing in a direction selected from the group of: up, down, left and right;
said directional indicators simultaneously appearing briefly and thereafter disappearing on said monitor a series of times;
(g) the user interacting with said computer with said response control comprising arrows up, down, left and right on a keyboard, joystick and/or a game controller;
(h) the user selecting, based on memory, from left to right, said arrows on said control corresponding to said more than one directional indicators, from left to right, shown on the monitor;
(i) said visual memory routine timing the reaction times from an appearance and/or disappearance of said directional indicators until the user's subsequent response with said response control, said visually memory routine data storing both said visual memory reaction times and the visual memory response accuracy of selecting directional indicators that correspond to said up, down, left and right directional indicators; and
(j) showing feedback on the monitor to said self-directed user based on at least said visual memory accuracy of the user's having selected directional indicators.

5. The method of claim 4 and further comprising the act of:
(k) displaying on the monitor said directional indicators as selected by the user, and as the user selects each said arrow further displaying the corresponding original arrow displayed by said visual memory routine.

6. The method of claim 5 wherein the computer provides at least one audible sound to indicate upon selection the accuracy and/or inaccuracy of the user's visual memory selections as the user inputs each arrow.

7. A method of claim 6 and further comprising the acts of:
(l) covering a user's left eye with a lens having a first color, and covering the user's right eye with a lens having a second, different color;
(m) using said computer program, the computer program having a visual alignment routine, said visual memory routine simultaneously displaying on said monitor a first object in said first color and a second object in said second color;
(n) user activating a controller to have said visual alignment routine to move said first object and said second object until the user perceives that they are aligned and thereafter user submitting an indication to said alignment routine said perception of alignment; and,
(o) displaying on said monitor a graphic image illustrating the alignment of the user's eyes.

8. The method of claim 7 and further comprising the act of displaying on said monitor a narrative explanation to the user of eye alignment in association with said graphic image.

9. The method of claim 8 wherein said graphic image depicts the user, the location of desired alignment, and the location of the users approximate alignment.

10. The method of claim 9 wherein said computer program is for sports training, and wherein said program displays on said monitor a menu choice allowing said user to change said program to train for different sports, said choice including at least baseball and football.

11. The method of claim 10 and further comprising providing the user at home with said computer software, a game controller, and glasses having one lens said first color and another lens said second color.

12. The method of claim 11 and further comprising the acts of:
(p) covering a user's left eye with a lens having a first color, and covering the user's right eye with a lens having a second, different color;
(q) using said computer program, the computer program having a visual flexibility computer routine, said visual flexibility routine measuring both accuracy and amount of separation achieved by the user;
(r) said series displaying simultaneously a first object in said first color and a second object in said second color moving slightly to the left and/or right with respect to each other during said series, an overlap of said first object and said second object allowing the user to perceive a three dimensional shape by keeping said first and second objected superimposed;
(s) the user interacting with said computer with a response control comprising arrows up, down, left and right on a keyboard, joystick and/or a game controller corresponding to an up, down, left or right position of said three dimensional shape;
(t) the user selecting one of said arrows on said control following each appearance of said three dimensional shape from said first and second objects being moved left or right with respect to each other;
(u) said visual tracking routine keeping the amount of separation, left to right, of the user and accuracy of selecting directional indicators that correspond to said up, down, left and right series of said three dimensional shapes; and
(v) showing feedback on the monitor to said self-directed user based on said amount of separation and said accuracy of the user's having selected directional indicators.

13. The method of claim 12 and further comprising providing the user a choice to in said visual flexibility routine between divergence or convergence of said first object and said second object.

14. The method of claim 1 wherein the computer provides at least one audible sound to indicate upon selection the accuracy and/or inaccuracy of the user's visual tracking selections.

15. The method of claim 1 and further comprising the acts of:
(f) using said computer program, the computer program having a visual memory computer routine, said visual memory routine simultaneously showing more than one directional indicators on the monitor each pointing in a direction selected from the group of: up, down, left and right;

said directional indicators simultaneously appearing briefly and thereafter disappearing on said monitor a series of times;

(g) the user interacting with said computer with said response control comprising arrows up, down, left and right on a keyboard, joystick and/or a game controller;

(h) the user selecting, based on memory, from left to right, said arrows on said control corresponding to said more than one directional indicators, from left to right, shown on the monitor;

(i) said visual memory routine timing the reaction times from an appearance and/or disappearance of said directional indicators until the user's subsequent response with said response control, said visually memory routine data storing both said visual memory reaction times and the visual memory response accuracy of selecting directional indicators that correspond to said up, down, left and right directional indicators; and (j) showing feedback on the monitor to said self-directed user based on at least said visual memory accuracy of the user's having selected directional indicators.

16. The method of claim 15 and further comprising the act of:

(k) displaying on the monitor said directional indicators as selected by the user, and as the user selects each said arrow further displaying the corresponding original arrow displayed by said visual memory routine.

17. The method of claim 15 wherein the computer provides at least one audible sound to indicate upon selection the accuracy and/or inaccuracy of the user's visual memory selections as the user inputs each arrow.

18. A method of claim 1 and further comprising the acts of:

(l) covering a user's left eye with a lens having a first color, and covering the user's right eye with a lens having a second, different color;

(m) using said computer program, the computer program having a visual alignment routine, said visual memory routine simultaneously displaying on said monitor a first object in said first color and a second object in said second color;

(n) user activating a controller to have said visual alignment routine to move said first object and said second object until the user perceives that they are aligned and thereafter user submitting an indication to said alignment routine said perception of alignment; and, (o) displaying on said monitor a graphic image (FIG. 7) illustrating the alignment of the user's eyes.

19. The method of claim 18 and further comprising the act of displaying on said monitor a narrative explanation (FIG. 7) to the user of eye alignment in association with said graphic image.

20. The method of claim 18 wherein said graphic image depicts the user, the location of desired alignment, and the location of the users approximate alignment (FIG. 7).

21. The method of claim 1 wherein said computer program is for sports training, and wherein said program displays on said monitor a menu choice allowing said user to change said program to train for different sports, said choice including at least baseball and football.

22. The method of claim 1 and further comprising providing the user at home with said computer software, a game controller, and glasses having one lens said first color and another lens said second color.

23. The method of claim 1 and further comprising the acts of:

(p) covering a user's left eye with a lens having a first color, and covering the user's right eye with a lens having a second, different color;

(q) using said computer program, the computer program having a visual flexibility computer routine, said visual flexibility routine measuring both accuracy and amount of separation achieved by the user;

(r) using said computer program, the computer program having a visual alignment routine, said visual memory routine displaying a visual alignment series on said monitor, said series displaying simultaneously a first object in said first color and a second object in said second color moving slightly to the left and/or right with respect to each other during said series, an overlap of said first object and said second object allowing the user to perceive a three dimensional shape by keeping said first and second objected superimposed;

(s) the user interacting with said computer with a response control comprising arrows up, down, left and right on a keyboard, joystick and/or a game controller corresponding to an up, down, left or right position of said three dimensional shape;

(t) the user selecting one of said arrows on said control following each appearance of said three dimensional shape from said first and second objects being moved left or right with respect to each other;

(u) said visual tracking routine keeping the amount of separation, left to right, of the user and accuracy of selecting directional indicators that correspond to said up, down, left and right series of said three dimensional shapes; and (v) showing feedback on the monitor to said self-directed user based on said amount of separation and said accuracy of the user's having selected directional indicators.

24. The method of claim 23 and further comprising providing the user a choice to in said visual flexibility routine between divergence or convergence of said first object and said second object.

25. A method of self-directed assessing and training a users s visual skills, comprising the acts of:

(a) using a computer program for use with a computer and a monitor;

(b) covering a user's left eye with a lens having a first color, and covering the user's right eye with a lens having a second, different color;

(c) using said computer program, the computer program having a visual alignment routine, said visual alignment routine simultaneously displaying on said monitor a first object in said first color and a second object in said second color;

(d) user activating a controller to have said visual alignment routine to move said first object and said second object until the user perceives that they are aligned and thereafter, the user submitting an indication to said alignment routine said perception of alignment; and, (e) displaying on said monitor a graphic image (FIG. 7) illustrating the alignment of the user's eyes.

26. The method of claim 25 and further comprising the act of displaying on said monitor a narrative explanation (FIG. 7) to the user of eye alignment in association with said graphic image.

27. The method of claim 26 wherein said graphic image depicts the user, the location of desired alignment, and the location of the user's approximate alignment (FIG. 7).

28. A method of self-directed assessing and training a user's visual skills, comprising the acts of:
  (a) covering a user's left eye with a lens having a first color, and covering the user's right eye with a lens having a second, different color;
  (b) using a computer program, the computer program having a visual flexibility computer routine, said visual flexibility routine measuring both accuracy and amount of separation achieved by the user;
  (c) using said computer program, the computer program having a visual alignment routine, said visual alignment routine displaying a visual alignment series on said monitor, said series displaying simultaneously a first object in said first color and a second object in said second color moving slightly to the left and/or right with respect to each other during said series, an overlap of said first object and said second object allowing the user to perceive a three dimensional shape by keeping said first and second objected superimposed;
  (d) the user interacting with said computer with a response control comprising arrows up, down, left and right on a keyboard, joystick andlor a game controller corresponding to an up, down, left or right position of said three dimensional shape;
  (e) the user selecting one of said arrows on said control following each appearance of said three dimensional shape from said first and second objects being moved left or right with respect to each other;
  (f) said visual tracking routine keeping the amount of separation, left to right, of the user and accuracy of selecting directional indicators that correspond to said up, down, left and right series of said three dimensional shapes; and
  (g) showing feedback on the monitor to said self-directed user based on said amount of separation and said accuracy of the user's having selected directional indicators.

29. The method of claim 28 and further comprising providing the user a choice to in said visual flexibility routine between divergence or convergence of said first object and said second object.

* * * * *